United States Patent [19]

Tsutsui et al.

[11] Patent Number: 5,788,603
[45] Date of Patent: Aug. 4, 1998

[54] CONTROL SYSTEM FOR AUTOMATIC TRANSMISSION

[75] Inventors: Hiroshi Tsutsui; Yoshihisa Yamamoto, both of Nishio; Masahiro Hayabuchi; Masaaki Nishida, both of Anjo, all of Japan

[73] Assignee: Aisin AW Co., Ltd., Japan

[21] Appl. No.: 645,954

[22] Filed: May 10, 1996

[30] Foreign Application Priority Data

May 12, 1995 [JP] Japan .................... 7-115012

[51] Int. Cl.⁶ .................................. F16H 61/20
[52] U.S. Cl. ........................... 477/116; 477/117
[58] Field of Search ............... 477/61, 116, 117, 477/115, 143, 156, 158

[56] References Cited

U.S. PATENT DOCUMENTS

| | | | |
|---|---|---|---|
| 4,718,525 | 1/1988 | Yamaguchi et al. | 477/143 X |
| 4,846,909 | 7/1989 | Hasegawa et al. | 477/117 X |
| 5,249,483 | 10/1993 | Iizuka | 477/117 |
| 5,385,511 | 1/1995 | Iizuka | 477/117 X |
| 5,558,599 | 9/1996 | Tsukamoto et al. | 477/116 |
| 5,655,993 | 8/1997 | Fujimoto et al. | 477/116 |

FOREIGN PATENT DOCUMENTS

| | | |
|---|---|---|
| 354493 | 2/1990 | European Pat. Off. . |
| 436978 | 7/1991 | European Pat. Off. . |
| 479349 | 4/1992 | European Pat. Off. . |
| 566399 | 10/1993 | European Pat. Off. . |
| 588627 | 3/1994 | European Pat. Off. . |
| 627580 | 12/1994 | European Pat. Off. . |
| 150557 | 6/1990 | Japan . |

*Primary Examiner*—Khoi Q. Ta
*Attorney, Agent, or Firm*—Lorusso & Loud

[57] ABSTRACT

A control system for an automatic transmission operates a clutch in a speed change unit to disconnect a transmission mechanism from a fluid transmission unit during a neutral operating state while the vehicle in a forward gear is held stopped by braking with the throttle fully closed. Reengagement of the clutch such as by depression of accelerator pedal (throttle open), release of the brake pedal, etc., is produced by a gradual increase in oil pressure to the servo operating the clutch to prevent clutch application shock. Wear on the clutch is reduced by abrupt increase of the oil pressure in response to satisfaction of a clutch engagement completion condition based upon input RPM, output RPM and the gear ratio of the target gear. In one embodiment, this abrupt increase occurs immediately after satisfaction of the clutch engagement completion condition when the throttle is open but occurs after elapse of a set time period from satisfaction of the clutch engagement completion condition when the throttle is closed. In a second embodiment when the throttle is closed, an application standby condition based on the input RPM, the output RPM and the gear ratio indicating backward vehicle movement is determined after the clutch engagement completion condition is satisfied. If backward movement is indicated, the abrupt increase in oil pressure is made after a set time period, otherwise the abrupt increase occurs immediately. In a third embodiment, a second clutch engagement completion condition requirement is substituted for the delay of the set time period of the second embodiment to prevent application shock during the clutch engagement.

5 Claims, 18 Drawing Sheets

|  | | Clutch | | | Brake | | | | One-way Clutch | | |
|---|---|---|---|---|---|---|---|---|---|---|---|
|  | | C1 | C2 | C3 | B1 | B2 | B3 | B4 | F1 | F2 | F3 |
| R | | × | ○ | × | × | × | ○ | ○ | × | × | × |
| N | | × | × | × | × | × | × | ○ | × | × | × |
| D | 1ST | ○ | × | × | × | × | (○) | ○ | × | ○ | ○ |
|  | 2ND | ○ | × | × | ○ | ○ | × | ○ | ○ | × | ○ |
|  | 3RD | ○ | × | ○ | ○ | ○ | × | × | ○ | × | × |
|  | 4TH | ○ | ○ | ○ | × | ○ | × | × | × | × | × |

*FIG. 5*

CONTROL SYSTEM FOR AUTOMATIC TRANSMISSION

BACKGROUND OF THE INVENTION

1. Field of the Invention

The present invention relates to a control system for an automatic transmission and, more particularly, to a control system for an automatic transmission which can prevent the misjudgment of the end of clutch engagement and accordingly the occurrence of the engagement shock.

2. Related Art

In the prior art, the automatic transmission is provided with a torque converter acting as a fluid transmission unit for receiving the rotation generated by an engine, and a speed change unit for changing the speed of the rotation transmitted from the torque converter. The speed change unit is equipped with a planetary gear unit composed of a plurality of gear elements, so that it may change the speed in accordance with a shift pattern which is set in advance in a manner corresponding to vehicle speed and throttle opening.

The automatic transmission is capable of selecting speed or gear ranges such as park (P), reverse (R), neutral (N), drive (D), third (3rd), second (2nd), first or low (1st). When the range is shifted from neutral (N) to drive (D) by the shift lever, for example, there arises the creep phenomenon, in which the rotation of the-engine in the idling state is transmitted through the torque converter to the speed change unit so that the vehicle moves forward slowly even when the accelerator pedal is not depressed.

Thus, there has been provided a control system eliminating creep for an automatic transmission. While the vehicle is substantially stopped and a forward running range such as D, 3rd, 2nd, or 1st is selected for the vehicle to run forward, the creep phenomenon is prevented by performing a neutral control to lower the oil pressure in the hydraulic servo of a first clutch thereby releasing the first clutch.

However in this prior art control system for an automatic transmission, the oil pressure fed to the hydraulic servo is increased gradually to engage the first clutch. As a result if an abrupt fluctuation occurs in the input torque, for example, the first clutch may begin to slip.

It has therefore been suggested (as disclosed in Japanese Patent Laid-Open No. 150557/1990) that the oil pressure fed to the hydraulic servo be gradually raised at first and then be abruptly raised when a target gear ratio is reached by the input/output speed ratio (the ratio of the rotative speed at the input side to the rotative speed at the output side) of a speed change unit. The rotative speed at the input side will be called the "input RPM", and the rotative speed at the output side will be called the "output RPM").

In this case, when the input/output speed ratio reaches the gear ratio of the target gear stage, slippage of the first clutch has disappeared due to complete engagement of the first clutch. As a result, no application shock occurs even if the oil pressure is then abruptly raised. In addition, the first clutch will not begin to slip even if an abrupt fluctuation occurs in the input torque.

When neutral control of a vehicle is started, no problem occurs on a level road. On an uphill road, however, the vehicle may move backward to raise the following problem.

Generally speaking, a speed or RPM sensor cannot detect whether the output shaft is rotating forward and backward. When the output RPM of the speed change unit is detected, it is assumed to be forward rotation, even if actually it is backward rotation. Thus backward rotation may erroneously indicate completion of clutch engagement.

FIG. 2 is a time chart of a control system for an automatic transmission of the prior art on a level road, and FIG. 3 is a time chart of a control system for an automatic transmission of the prior art on an uphill road.

In these Figures, reference characters t1 designate a start time for beginning the clutch engagement application procedure; characters t2 designate a completion or end time for the clutch application; characters t3 designate a false time which erroneously indicates the completion of the clutch application; characters $N_{C1}$ designates an input RPM; characters $N_O$ designates an output RPM; characters $N_{C1X}$ designates a detected input RPM detected by an input RPM sensor (not shown in FIGS. 2 and 3); and characters $N_{OX}$ designate a detected output RPM detected by an output RPM sensor (not shown in FIGS. 2 and 3).

When the vehicle is started on a level road, as illustrated in FIG. 2, the input/output RPM ratio reaches the gear ratio of a target gear stage ifa value $N_O \cdot i$, as calculated by multiplying the output RPM $N_O$ by the gear ratio i of the speed change unit (not shown in FIG. 2), is equal to the input RPM $N_{C1}$. Then, it is possible to decide the completion of the clutch engagement.

On the other hand, when the vehicle is started on an uphill road as shown in FIG. 3, the actual output RPM $N_O$ has a negative value, and the value $N_O \cdot i$ or the product of the actual output RPM $N_O$ and the gear ratio i of the speed change unit also is a negative value. As the clutch engagement procedure advances, the actual input RPM $N_{C1}$ gradually drops to a negative value. However, the detected output RPM $N_{OX}$, the value $N_{OX} \cdot i$ (the product of multiplying the detected output RPM $N_{OX}$ by the gear ratio i of the speed change unit), and the detected input RPM $N_{C1X}$ are always positive values.

Hence, at the time t3, the value $N_{OX} \cdot i$ and the detected input RPM $N_{C1X}$ are equal so that the completion of clutch engagement is indicated even though the clutch engagement is not actually completed as a matter of fact.

Because of the false indication of clutch engagement, the oil pressure of the first clutch is abruptly raised so that the output torque highly fluctuates causing application shock in the vehicle.

SUMMARY OF THE INVENTION

The present invention has an object to solve the aforementioned problems of the control system for an automatic transmission of the prior art and to provide a control system for an automatic transmission which can prevent the misjudgment of the completion of clutch engagement and accordingly prevent the occurrence of the application shock.

According to a first aspect of the present invention, there is provided a control system for an automatic transmission having a speed change unit with a transmission mechanism, the control system including: a fluid transmission unit for transmitting rotation of an engine to the speed change unit; a clutch adapted to be applied when a forward running range is selected to transmit the rotation from the fluid transmission unit to the transmission mechanism of the speed change unit; a hydraulic servo for engaging and releasing the clutch; a throttle opening detector for detecting a throttle opening; a stopped state detector for detecting a vehicle stopped state defined by (a) a forward running range being selected, (b) the throttle opening detector detecting that the throttle opening being fully closed, (c) a brake pedal being depressed, and (d) vehicle speed being substantially zero; an input speed detector for detecting input rotative speed of the speed change unit; output speed detector for detecting output rotative speed of the speed change unit; a hydraulic control for controlling the oil pressure to be fed to the hydraulic servo; and a control unit. The control unit includes: release facilities for releasing the clutch by decreasing the oil pressure fed to the hydraulic servo if the vehicle stopped state is detected by the stopped state detector; and application facilities for engaging the clutch by increasing the oil pressure fed to the hydraulic servo when the vehicle stopped state is absent as detected by the stopped state detector while the clutch is released. The application facilities include: gradual raising facilities for gradually increasing the oil pressure fed to the hydraulic servo; application ending condition satisfaction deciding facilities for deciding satisfaction or non-satisfaction of a clutch engagement completion condition indicating completion of engagement of the clutch based on the input rotative speed, the output rotative speed and a gear ratio of a target gear stage; and abrupt raising facilities for abruptly increasing the oil pressure fed to the hydraulic servo in response to the satisfaction of the clutch engagement completion condition if the throttle opening detector detects that (a) the throttle opening is not fully closed or (b) the throttle opening is fully closed after elapse of a set time period from the instant of the satisfaction the clutch engagement completion condition.

If the throttle opening is not fully closed, that is, if the accelerator pedal is depressed, a relatively high torque is transmitted to the speed change unit to increase the output torque of the vehicle as the engagement of the clutch starts. Thus, even if the vehicle moves backward at the instant of applying the clutch, the output torque acts to prevent the backward movement of the vehicle abruptly. As a result, the decision of the clutch engagement completion is not erroneously made because of backward movement of the vehicle. If the throttle opening is not fully closed, therefore, the oil pressure is gradually raised at first and is then abruptly raised if the clutch engagement completion condition is satisfied.

As a result, the clutch does not slip even if the input torque to the speed change unit is caused to fluctuate by depressing the accelerator pedal or the like.

If the throttle opening is fully closed, on the other hand, the clutch engagement completion condition may be erroneously determined because of backward movement of the vehicle. Therefore, the oil pressure to be fed to the hydraulic servo is abruptly raised after a set time period has elapsed from the instantof satisfying the clutch engagement completion condition. As a result of the requirement for lapse of the set time period, it is possible to prevent the abrupt the rise in the oil pressure in the course of application of the clutch and accordingly to prevent the occurrence of the application shock.

In this case, the throttle opening is fully closed so that the input torque to the speed change unit does not significantly fluctuate. Thus, the clutch does not slip even if the decision of the application end is more or less delayed.

According to another aspect of the present invention, there is provided a control system for an automatic transmission having a speed change unit with a transmission mechanism, the control system including: a fluid transmission unit for transmitting rotation of an engine to the speed change unit; a clutch adapted to be applied when a forward running range is selected to transmit the rotation from the fluid transmission unit to the transmission mechanism of the speed change unit; a hydraulic servo for engaging and releasing the clutch; a throttle opening detector for detecting a throttle opening; a stopped state detector for detecting a vehicle stopped state defined by (a) a forward running range being selected, (b) the throttle opening detector detecting that the throttle opening being fully closed, (c) a brake pedal being depressed, and (d) vehicle speed being substantially zero; an input speed detector for detecting input rotative speed of the speed change unit; an output speed detector for detecting output rotative speed of the speed change unit; a hydraulic control for controlling the oil pressure to be fed to the hydraulic servo; and a control unit. The control unit includes: release facilities for releasing the clutch by decreasing the oil pressure fed to the hydraulic servo if the vehicle stopped state is detected by the stopped state detector; and application facilities for engaging the clutch by increasing the oil pressure fed to the hydraulic servo when the vehicle stopped state is absent as detected by the stopped state detector while the clutch is released. The application facilities includes: gradual raising facilities for gradually increasing the oil pressure fed to the hydraulic servo; application ending condition satisfaction deciding facilities for deciding satisfaction or non-satisfaction of a clutch engagement completion condition indicating completion of engagement of the clutch based on the input rotative speed, the output rotative speed and a gear ratio of a target gear stage; application standby condition satisfaction deciding facilities for deciding satisfaction or non-satisfaction of an application standby condition after the satisfaction of the clutch engagement completion condition; and abrupt raising facilities for abruptly raising the oil pressure to be fed to the hydraulic servo, on the basis of the satisfactions of the clutch engagement completion condition and the application standby condition. The abrupt raising facilities abruptly increases the oil pressure to be fed to the hydraulic servo in response to (a) the satisfaction of the clutch engagement completion condition if the throttle opening detector detects that the throttle opening is not fully closed, (b) the satisfaction of the application standby condition after a second set time period has elapsed from the instant of the satisfaction of the clutch engagement completion condition if the satisfaction of the application standby condition occurs within a first set time period from the instant of the satisfaction of the clutch engagement completion condition, or (c) the throttle opening detector detecting that the throttle opening is fully open after the first set time period from the instant of the satisfaction of the clutch engagement completion condition and the non-satisfaction of the application standby condition within the first set time period from the instant of the satisfaction of the clutch engagement completion condition.

The application standby condition satisfaction deciding means decides whether or not the application standby condition is satisfied after the clutch engagement completion condition has been satisfied on the basis of the input rotative speed, the output rotative speed and the gear ratio of the target gear stage.

The abrupt raising means gradually raises the oil pressure at first, if the throttleopening is not fully closed, and then abruptly raises it if the clutch engagement completion condition is satisfied. As a result, the clutch does not slip even if the input torque to the speed change unit is caused to fluctuate by depressing the accelerator pedal or the like.

If the throttle opening is fully closed, on the other hand, the decision of the clutch engagement completion condition may be erroneous. Therefore, whether or not the application standby condition is satisfied is decided by the time a first set time elapses from the instant of satisfying the clutch engagement completion condition. If the application standby condition is satisfied, it is found that the vehicle is moving backward. Therefore, the oil pressure to be fed to the hydraulic servo is abruptly raised after a second set time has elapsed from the instant of satisfying the clutch engagement completion condition. This makes it possible to prevent the abrupt rise in the oil pressure in the course of engagement of the clutch and accordingly to prevent the occurrence of application shock.

If the application standby condition is not satisfied by the time the first set time elapses, it is found that the vehicle is not moving back. Therefore, the oil pressure to be fed to the hydraulic servo is abruptly raised after the first set time has elapsed from the instant of satisfying the clutch engagement completion condition. This makes it possible to prevent unnecessary delay of the rise in the oil pressure.

According to still another aspect of the present invention, there is provided a control system for an automatic transmission having a speed change unit with a transmission mechanism, the control system comprising: a fluid transmission unit for transmitting rotation of an engine to the speed change unit; a clutch adapted to be applied when a forward running range is selected to transmit the rotation from the fluid transmission unit to the transmission mechanism of the speed change unit; a hydraulic servo for engaging and releasing the clutch; a throttle opening detector for detecting a throttle opening; a stopped state detector for detecting a vehicle stopped state defined by (a) a forward running range being selected, (b) the throttle opening detector detecting that the throttle opening being fully closed, (c) a brake pedal being depressed, and (d) vehicle speed being substantially zero; an input speed detector for detecting input rotative speed of the speed change unit; an output speed detector for detecting output rotative speed of the speed change unit; a hydraulic control for controlling the oil pressure to be fed to the hydraulic servo; and a control unit. The control unit includes: release facilities for releasing the clutch by decreasing the oil pressure fed to the hydraulic servo if the vehicle stopped state is detected by the stopped state detector; and application facilities for engaging the clutch by increasing the oil pressure fed to the hydraulic servo when the vehicle stopped state is absent as detected by the stopped state detector while the clutch is released. The application facilities includes: gradual raising facilities for gradually increasing the oil pressure fed to the hydraulic servo; first application ending condition satisfaction deciding facilities for deciding satisfaction or non-satisfaction of a first clutch engagement completion condition indicating completion of engagement of the clutch based on the input rotative speed, the output rotative speed and a gear ratio of a target gear stage; application standby condition satisfaction deciding facilities for deciding satisfaction or non-satisfaction of an application standby condition after the satisfaction of the first clutch engagement completion condition; second application ending condition satisfaction deciding facilities for deciding satisfaction or non-satisfaction of a second clutch engagement completion condition after the satisfaction of the application standby condition; and abrupt raising facilities for abruptly raising the oil pressure to be fed to the hydraulic servo, on the basis of the satisfactions of the first clutch engagement completion condition, the application standby condition and the second clutch engagement completion condition. The abrupt raising facilities abruptly increases the oil pressure fed to the hydraulic servo in response to (a) the satisfaction of the first application ending condition if the throttle opening detector detects that the throttle opening is not fully closed, (b) the satisfaction of the second clutch engagement completion condition if the throttle opening detector detects that the throttle opening is not fully closed and if the satisfaction of the application standby condition occurs within a first set time period from the instant of the satisfaction of the first clutch engagement completion condition, or (c) elapse of the second set time period from the instant of the satisfaction of the second clutch engagement completion condition if the non-satisfaction of the application standby condition at elapse of the first set time period from the instant of satisfying the first clutch engagement completion condition.

During gradual increase of the oil pressure by the gradual raising facilities, the output rotative speed increases as the input rotative speed decreases. The first application ending condition satisfaction deciding means decides whether or not the first clutch engagement completion condition dictating the application end of the clutch, on the basis of the input rotative speed, the output rotative speed and the gear ratio of the target gear stage. Next, the application standby condition satisfaction deciding means decides whether or not the application standby condition is satisfied based on the input rotative speed, the output rotative speed and the gear ratio of the target gear stage after the first clutch engagement completion condition has been satisfied.

The abrupt raising means gradually raises the oil pressure at first, if the throttle opening is not fully closed, and then abruptly raisesit if the first clutch engagement completion condition is satisfied.

As a result, the clutch does not slip even if the input torque to the speed change unit is caused to fluctuate by depressing the accelerator pedal or the like.

If the throttle opening is fully closed, on the other hand, the decision of the end of application may be erroneous. Therefore, whether or not the application standby condition is satisfied is decided by the time a first set time elapses after the first clutch engagement completion condition has been satisfied. After the application standby condition has been satisfied, it is further decided whether or not the second clutch engagement completion condition is satisfied based on the input rotative speed, the output rotative speed and the gear ratio of the target gear stage.

If the application standby condition is satisfied by the time the first set time elapses from the instant of satisfying the first clutch engagement completion condition, the oil pressure to be fed to the hydraulic servo is abruptly raised when the second clutch engagement completion condition is satisfied. This makes it possible to prevent the abrupt rise in the oil pressure in the course of application of the clutch and accordingly to prevent the occurrence of the application shock.

If the application standby condition is not satisfied by the time the first set time elapses from the instant of satisfying the first clutch engagement completion condition, it is found that the vehicle is not moving back. Therefore, the oil pressure to be fed to the hydraulic servo is abruptly raised after the first set time has elapsed from the instant of satisfying the first clutch engagement completion condition. This makes it possible to prevent unnecessary delay of the rise in the oil pressure.

If the vehicle stopped state is not detected by the stopped state detecting means while the clutch is being released by the release means, the gradual raising means gradually raises the oil pressure to be fed to the hydraulic servo.

BRIEF DESCRIPTION OF THE DRAWING

FIG. 5 is a table setting forth the operation of the automatic transmission in the first embodiment of FIGS. 1 and 4;

DESCRIPTION OF THE PREFERRED EMBODIMENTS

Figure 1:
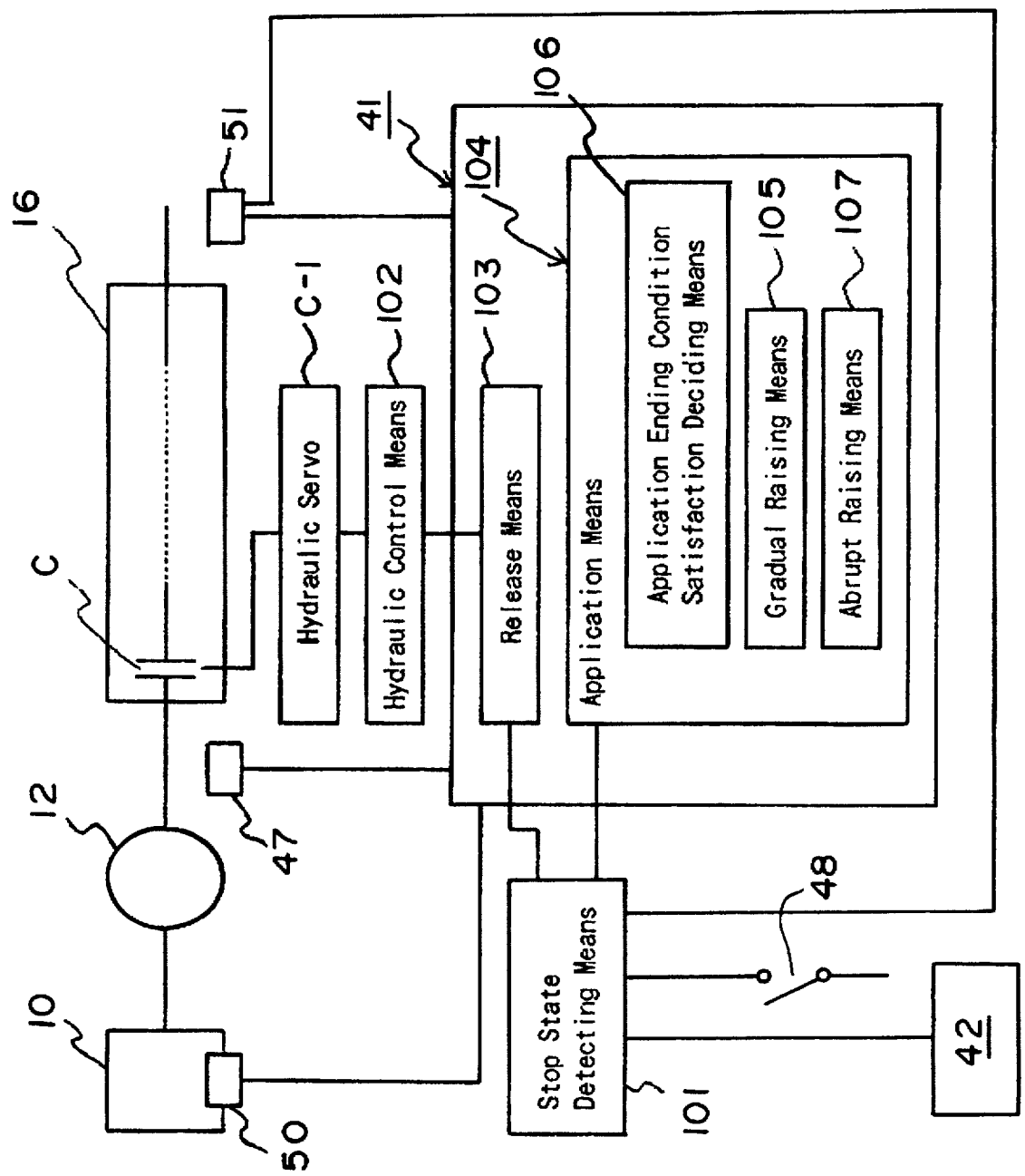
FIG. 1 is a functional block diagram of a control system for an automatic transmission in accordance with a first embodiment of the present invention.
Figure 2:
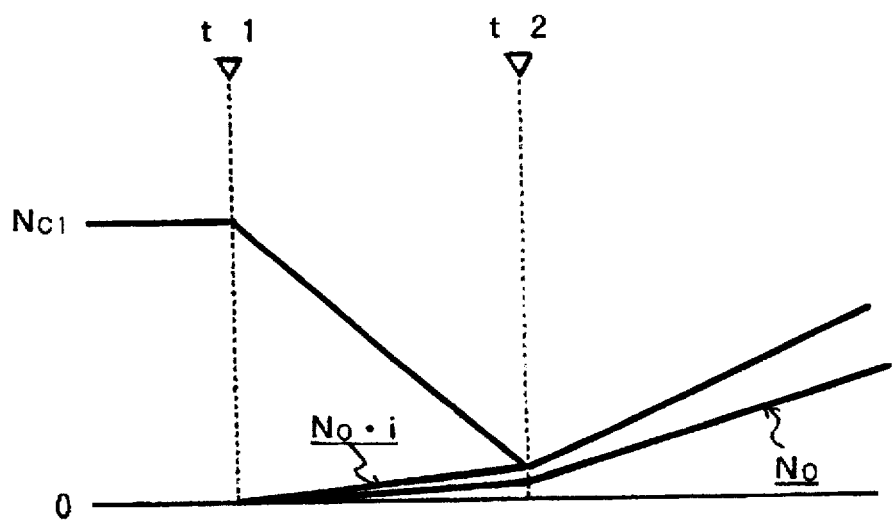
FIG. 2 is a time chart of an operation of a control system for an automatic transmission of the prior art on a level road.
Figure 3:
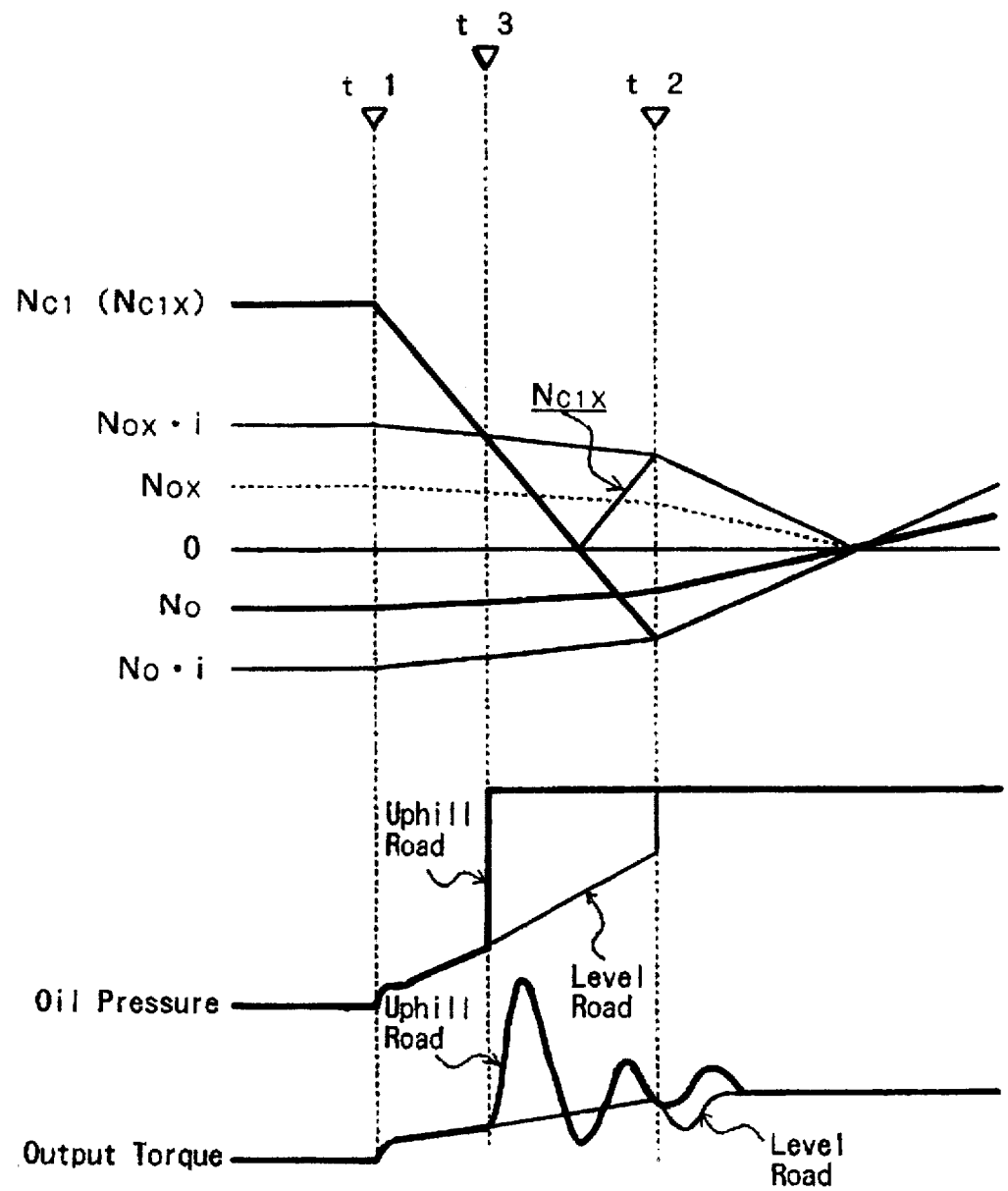
FIG. 3 is a time chart of an operation of a control system for an automatic transmission of the prior art on an uphill road.

One embodiment of a control system for an automatic transmission in accordance with the invention is illustrated in FIG. 1 wherein reference numeral 10 designates an engine; numeral 12 designates a torque converter acting as a fluid transmission unit for transmitting rotation of the engine 10 to a speed change unit 16; letter C designates a clutch adapted to be engaged (applied) when a forward running range is selected to transmit rotation from the torque converter 12 to a transmission mechanism (not shown in FIG. 1) of the speed change unit 16; and characters C-1 designate a hydraulic servo for operating the clutch C. Reference numeral 41 designates an automatic transmission control unit acting as a control system; numeral 47 designates a rotative speed (RPM) sensor acting as input rotative speed detecting means for detecting an input rotative speed or RPM $N_{C1}$ of the speed change unit 16; numeral 50 designates a throttle opening sensor acting as throttle opening detecting means for detecting a throttle opening θ; numeral 51 designates a vehicle speed sensor acting as output speed or RPM detecting means for detecting an output RPM $N_O$ of the speed change unit 16; numeral 101 designates stopped state detecting means for detecting the stopped state of a vehicle. The detected stopped state of the vehicle is defined by (a) a forward running range being selected, (b) the throttle sensor 50 detecting that the throttle opening θ is fully closed, (c) the brake pedal (not shown) being depressed, and (d) the vehicle speed being substantially zero. Numeral 102 designates hydraulic control means for controlling an oil pressure to be fed to the hydraulic servo C-1.

The automatic transmission control unit 41 is provided with: release means 103 for releasing the clutch C by decreasing the oil pressure fed to the hydraulic servo C-1, when the stopped state of the vehicle is detected by the stopped state detecting means 101; and application means 104 for applying the clutch C by increasing the oil pressure to be fed to the hydraulic servo C-1, in response to the stopped state of the vehicle is detected by the stopped state detecting means 101 while the clutch C is being released by the release means 103. The release means 103 lowers the oil pressure to be fed to the hydraulic servo C-1, thereby to release the clutch C. On the other hand, if the vehicle stopped state is not detected by the stopped state detecting means 101 while the clutch C is being released by the release means 101, the application means 104 raises the oil pressure to be fed to the hydraulic servo, thereby to apply the clutch.

The application means 104 is equipped with: gradual raising means 105 for gradually increasing the oil pressure to be fed to the hydraulic servo C-1; application ending condition satisfaction deciding means 106 for deciding satisfaction or non-satisfaction of a clutch engagement completion condition dictating the engagement completion of the clutch C, based on the input RPM, the output RPM and the gear ratio of a target gear stage; and abrupt raising means 107 for abruptly increasing the oil pressure to be fed to the hydraulic servo C-1 based on the satisfaction of the clutch engagement completion condition.

The abrupt raising means 107 abruptly increases the oil pressure fed to the hydraulic servo C-1 in response to either (a) the satisfaction of the clutch engagement completion condition if the throttle opening θ is not fully closed, or (b) elapse or a first set time period from the instant of satisfaction of the clutch engagement completion condition if the throttle opening θ is fully closed.

Figure 4:
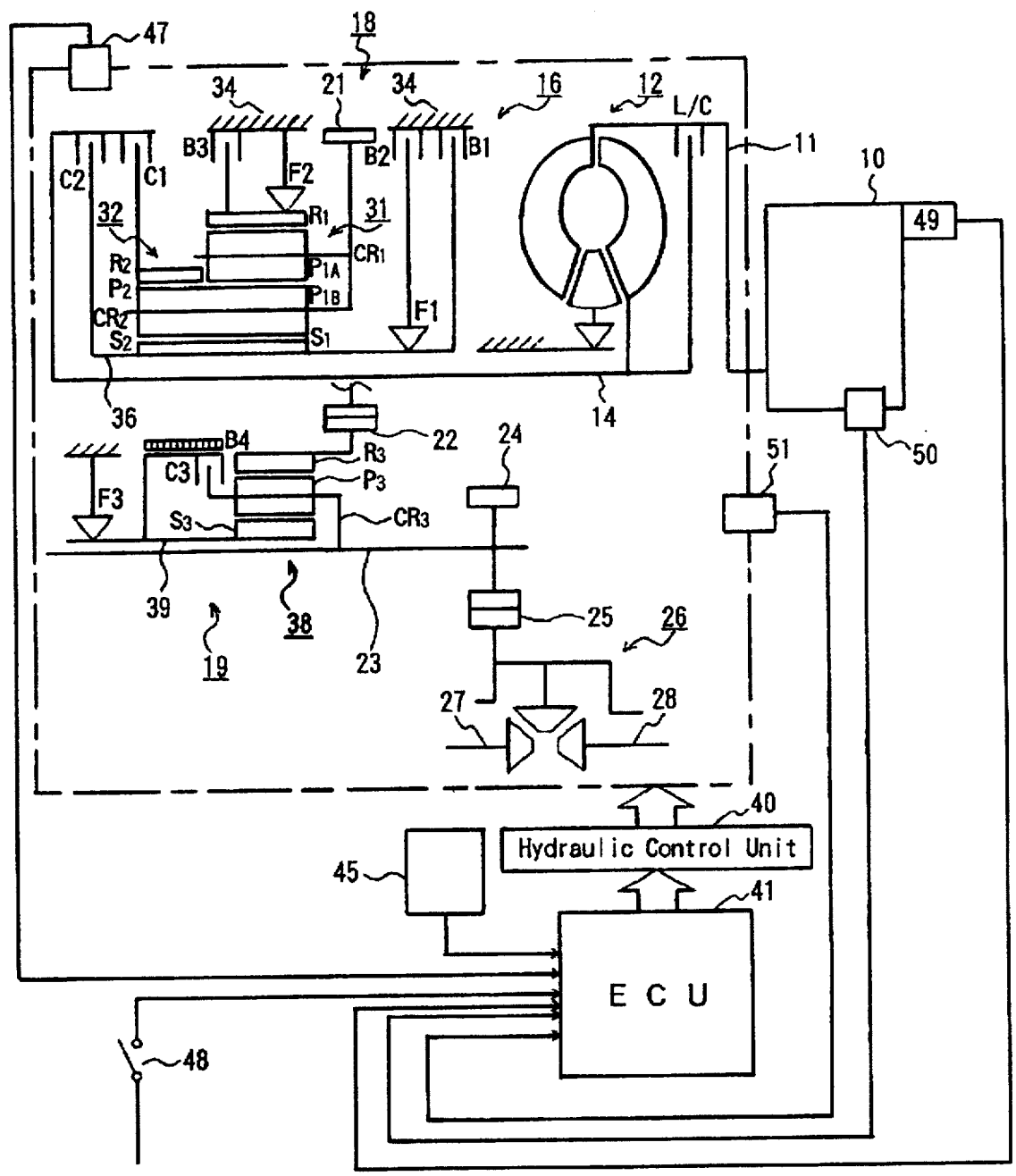
FIG. 4 is a schematic diagram of an automatic transmission in the first embodiment of FIG. 1.

As shown in FIG. 4, the rotation generated by the engine 10 is transmitted through an engine output shaft 11 to the torque converter 12. This torque converter 12 transmits the rotation of the engine 10 to a converter output shaft 14 either through a fluid (working oil) coupling or through a lockup clutch L/C. The lockup clutch is engaged when the vehicle speed exceeds a predetermined value to pass the rotation directly to the converter output shaft 14 to decrease losses in the fluid coupling.

The converter output shaft 14 is connected to the speed change unit 16 which has four forward speed ranges and one reverse speed range. This speed change unit 16 includes a main transmission 18 for three forward speeds and one reverse speed and an under-drive auxiliary transmission 19. The rotation of the main transmission 18 is transmitted through a counter drive gear 21 and a counter driven gear 22 to the auxiliary transmission 19. From the output shaft 23 of the auxiliary transmission 19, the rotation is transmitted through an output gear 24 and a ring gear 25 to a differential mechanism 26.

In this differential mechanism 26, the rotation transmitted through the output gear 24 and the ring gear 25 is transmitted to lefthand and righthand drive shafts 27 and 28 connected to the drive wheels (not shown).

The main transmission 18 is equipped with a first planetary gear unit 31 and a second planetary gearunit 32 and further with the first clutch C1, a second clutch C2, a first brake B1, a second brake B2, a third brake B3 and one-way clutches F1 and F2 for transmitting the torque selectively between the individual elements of the two planetary gear units 31 and 32. The first clutch C1 functions as an input clutch for transmitting the rotation from the torque converter 12 to the transmission mechanism which is constructed of the remaining elements of the first main transmission 18 and the auxiliary transmission 19.

The first planetary gear unit 31 is composed of: a ring gear $R_1$ connected to a drive unit casing 34 through the third brake B3 and the one-way clutch F2 which are arranged in parallel with each other; a sun gear $S_1$ formed on a sun gear shaft 36 fitted on and rotatably supported by the output shaft 14; a carrier $CR_1$ connected to the counter drive gear 21; and pinions $P_{1A}$ and $P_{1B}$ meshing between the ring gear $R_1$ and the sun gear $S_1$ and rotatably supported by the carrier $CR_1$.

The sun gear shaft 36 is connected through the second clutch C2 to the output shaft 14. The sun gear shaft 36 is further connected through the first brake B1 to the drive unit casing 34 and throughthe one-way clutch F1 and the second brake B2, as arranged in series, to the drive unit casing 34.

On the other hand, the second planetary gear unit 32 is composed of: a ring gear $R_2$ connected through the first clutch C1 to the output shaft 14; a sun gear $S_2$ formed on the sun gear shaft 36 integrally with the sun gear $S_1$; a carrier $CR_2$ connected to the carrier $CR_1$; and a pinion $P_2$ meshing between the ring gear R2 and the sun gear $S_2$, rotatably supported by the carrier CR2 and formed integrally with the pinion $P_{1B}$.

The counter drive gear 21 is made to mesh with the counter driven gear 22 arranged in the auxiliary transmission 19, to transmit the rotation, as has its speed changed by the main transmission 18, to the auxiliary transmission 19.

This auxiliary transmission 19 is equipped with a third planetary gear unit 38 and with a third clutch C3, a fourth brake B4 and a one-way clutch F3 for transmitting the torque selectively between the individual elements of the third planetary gear unit 38.

The third planetary gear unit 38 is composed of: a ring gear $R_3$ connected to the counter driven gear 22; a sun gear $S_3$ formed on a sun gear shaft 39 rotatably fitted on the output shaft 23; a carrier $CR_3$ fixed on the output shaft 23; and a pinion $P_3$ meshingbetween the ring gear $R_3$ and the sun gear $S_3$ and rotatably supported by the carrier $CR_3$.

In operation of the automatic transmission as shown in FIG. 5: characters C1 designate the first brake; characters C2 designate the second clutch; characters C3 designate the third clutch; characters B1 designate the first brake; characters B2 designate the second brake; characters B3 designate the third brake; characters B4 designate the fourth brake; and characters F1 to F3 designate the one-way clutches. The letter R designates a reverse running range; letter N designates neutral; letter D designates a drive (D) range; characters 1ST designate a first or low speed gear stage; characters 2ND designate a second speed gear stage; characters 3RD designate a third speed gear stage; and characters 4TH designate a fourth speed gear stage.

Symbol ○ indicates that the first clutch C1, the second clutch C2, the third clutch C3, the first brake B1, the second brake B2, the third brake B3 and the fourth brake B4 are engaged (applied), and that the one-way clutches F1 to F3 are locked. On the other hand, symbol X indicates that the first clutch C1, the second clutch C2, the third clutch C3, the first brake B1, the second brake B2, the third brake B3 and the fourth brake B4 are released, and that theone-way clutches F1 to F3 are free.

Symbol (○) indicates that the third brake B3 is applied at the engine brake time.

At the 1st speed in the D-range, the first clutch C1 and the fourth brake B4 are applied to lock the one-way clutches F2 and F3. Then, the rotation of the output shaft 14 is transmitted through the first clutch C1 to the ring gear $R_2$. In this state, the rotation of the ring gear $R_1$ is blocked by the one-way clutch F2 so that the rotation of the carrier $CR_2$ is drastically decelerated and transmitted to the counter driven gear 21 while rotating the sun gear $S_2$ idly.

The rotation, as transmitted from the counter drive gear 21 to the counter driven gear 22, is transmitted to the ring gear $R_3$. However, the rotation of the sun gear $S_3$ is blocked by the fourth brake B4 so that the rotation of the carrier $CR_3$ is further decelerated and transmitted to the output shaft 23.

At the 2nd speed in the D-range, on the other hand, the first clutch C1, the first brake B1, the second brake B2 and the fourth brake B4 are applied to lock the one-way clutches F1 and F3. Then, the rotation of the output shaft 14 is transmitted through the first clutch C1 to the ring gear R2. The rotation of this ring gear $R_2$ is decelerated and transmitted tothe carrier $CR_2$, because the rotation of the sun gear $S_2$ is blocked by the second brake B2 and the one-way clutch F1. The rotation of-the carrier CR2 is transmitted to the counter drive gear 21 while rotating the ring gear $R_1$ idly.

The rotation, as transmitted from the counter drive gear 21 to the counter driven gear 22, is transmitted to the ring gear $R_3$. However, the rotation of the sun gear $S_3$ is blocked by the fourth brake B4 so that the rotation of the carrier $CR_3$ is decelerated and transmitted to the output shaft 23.

Next, at the 3rd speed in the D-range, the first clutch C1, the third clutch C3, the first brake B1 and the second brake B2 are applied to lock the one-way clutch F1. Then, the rotation of the output shaft 14 is transmitted through the first clutch C1 to the ring gear R2. The rotation of this ring gear R2 is decelerated and transmitted to the carrier CR2 because the rotation of the sun gear $S_2$ is blocked by the second brake B2 and the one-way clutch F1. The rotation of the carrier CR2 is transmitted to the counter drive gear 21 while rotating the ring gear $R_1$ idly.

The rotation, as transmitted from the counter drive gear 21 to the counter driven gear 22, is transmitted to the ring gear $R_3$. However, the relativerotation between the carrier $CR_3$ and the sun gear $S_3$ is blocked by the third clutch C3 so that the third planetary gear unit 38 comes into a direct-coupled state. As a result, the rotation of the counter driven gear 22 is transmitted unchanged to the output shaft 23.

Next, at the 4th speed in the D-range, the first clutch C1, the second clutch C2, the third clutch C3 and the second brake B2 are applied. Then, the rotation of the output shaft 14 is transmitted through the first clutch C1 to the ring gear R2 and through the second clutch C2 to the sun gear $S_2$ to bring the first planetary gear unit 31 and the second planetary gear unit 32 into direct-coupled states. As a result, the rotation of the output shaft 11 is transmitted unchanged to the counter drive gear 21.

The rotation, as transmitted from the counter drive gear 21 to the counter driven gear 22, is transmitted to the ring gear $R_3$. However, the relative rotation between the carrier $CR_3$ and the sun gear $S_3$ is blocked by the third clutch C3 so that the third planetary gear unit 38 comes into the direct-coupled state. As a result, the rotation of the counter driven gear 22 is transmitted unchanged to the output shaft 23.

The automatic transmission is provided with a hydraulic control unit 40 for establishing the individual gear stages by engaging/releasing the first clutch C1, the second clutch C2, the third clutch C3, the first brake B1, the second brake B2, the third brake B3 and the fourth brake B4.

The hydraulic control unit 40 is connected with the automatic transmission control unit (ECU) 41 so that they are operated according to the control program of the automatic transmission control unit 41.

With this automatic transmission control unit 41, on the other hand, there are individually connected a neutral start switch (N.S.S.W.) 45, an RPM sensor 47, a brake switch 48, the engine RPM sensor 49, a throttle opening sensor 50 and a vehicle speed sensor 51. The shift position of the not-shown shift lever, i.e., the selected range is detected by the neutral start switch 45. The input RPM $N_{c1}$ can be detected by the RPM sensor 47.

Furthermore, whether or not the brake pedal (not shown) is depressed can be detected by the brake switch 48. An engine RPM $N_E$ can be detected by the engine RPM sensor 49. The throttle opening θ can be detected by the throttle opening sensor 50. The outputRPM No of the speed change unit 16, i.e., the vehicle speed can be detected by the vehicle speed sensor 51.

Figure 6:
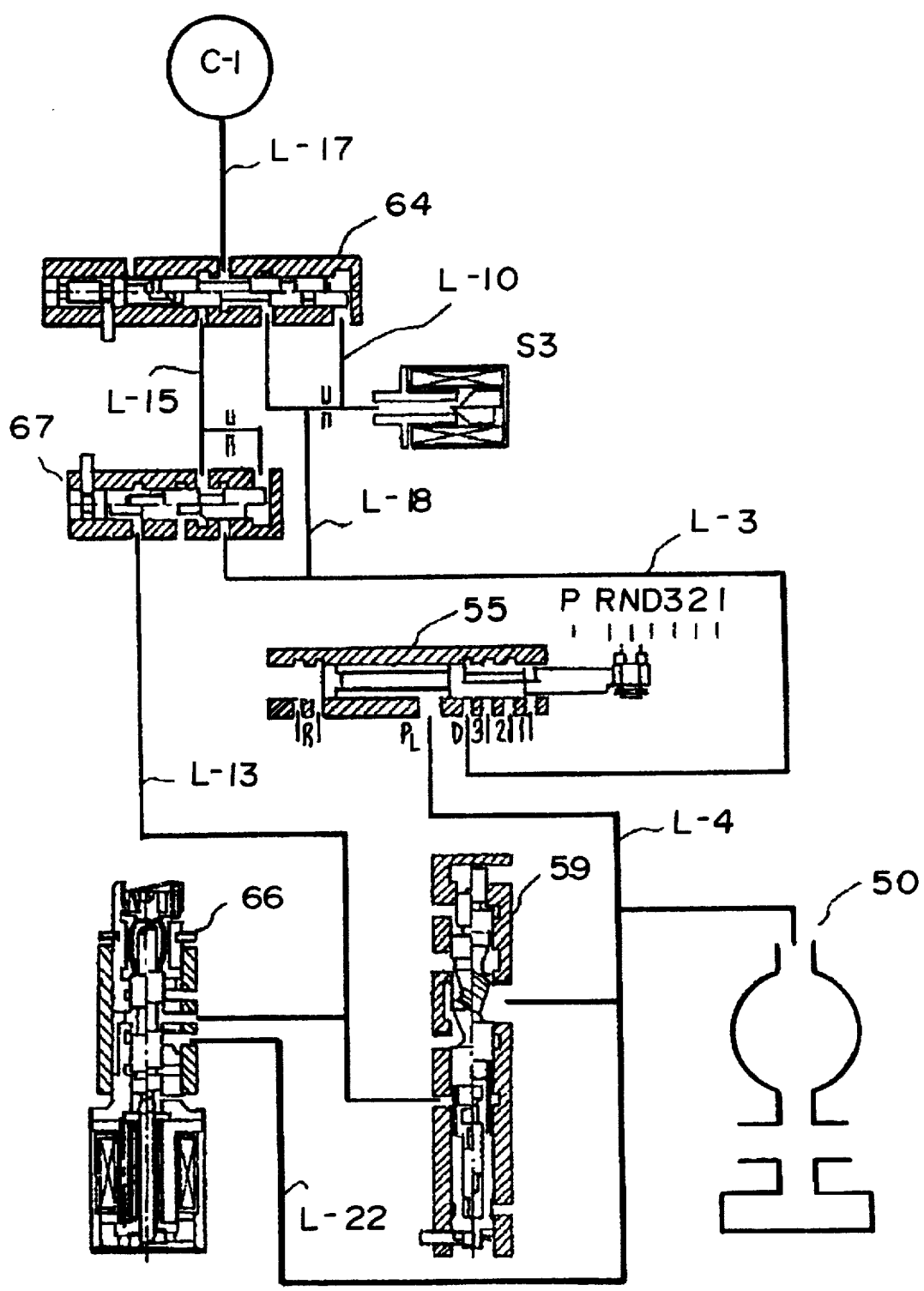
FIG. 6 is a hydraulic circuit diagram of an essential portion of a hydraulic control unit in the first embodiment of FIGS. 1 and 4.

In the essential portion of the hydraulic control unit 40 as shown in FIG. 6, a primary valve 59 regulates the oil pressure coming from the a pump 50 and outputs it as a line pressure to an oil line L-4. A manual valve 55 is provided with ports 1, 2, 3, D, $P_L$ and R so that the line pressure, as output from the primary valve 59, is fed via the oil line L-4 to the port $P_L$. The manual valve 55 is connected to the shift lever, which is operated to output the line pressure as the 1st-range pressure, the 2nd-range pressure, 3rd-range pressure, the D-range pressure and the R-range pressure from the ports 1, 2, 3, D and R.

When the shift lever is placed in the D-range position, the oil under the D-range pressure, as generated in the port D, is fed to the individual hydraulic servos to apply the first clutch C1 (FIG. 4), the second clutch C2, the third clutch C3, the first brake B1, the second brake B2 and the third brake B3, selectively, thereby establishing one of the gear stages.

In this case, the selected gear stage is set to correspond to the vehicle speed and the throttle opening θ so that a shift output is generated, i.e., solenoid signals corresponding to the selected shift output are turned ON/OFF. When the solenoid valves are opened/closed in response to the ON/OFF of the solenoid valves, the corresponding 1-2 shift valve (not shown), 2-3 shift valve (not shown) and 3-4 shift valve (not shown) are switched.

A linear solenoid valve 66 is provided for the neutral control. This linear solenoid valve 66 is controlled in response to the signal from the hydraulic control unit 40 (FIG. 4) so that it adjusts the oil pressure, as fed from the primary valve 59 via an oil line L-22, to generate a throttle pressure $P_{TH}$. The linear solenoid valve 66 feeds the throttle pressure $P_{TH}$ as a control oil pressure to a C-1 control valve 67 via an oil line L-13.

The C-1 control valve 67 is fed with the D-range pressure via an oil line L-3 so that it regulates the fed D-range pressure to the oil pressure of the hydraulic servo C-1 (as will be called the "C-1 oil pressure") $P_{C1}$ corresponding to the throttle pressure $P_{TH}$ from the linear solenoid valve 66 and feeds it to an oil line L-15.

The oil line L-15 is connected a neutral relay valve 64 which is connected to a hydraulic servo C-1 via an oil line L-17 and to a solenoid valve S3 via an oil line L-10. The neutral relay valve 64 is connected with the oil line L-3 via an oil line L-18 so that it can feed the D-range pressure.

At the neutral control time, the solenoid valve S3 is turned ON so that the neutral relay valve 64 takes its upper half position. As a result, the C-1 oil pressure $P_{C1}$, as generated in the oil line L-15, is fed via the oil line L-17 to the hydraulic servo C1.

At the 1st to 4th speed times, on the other hand, the solenoid valve S3 is turned OFF so that the neutral relay valve 64 takes its lower half position. As a result, the oil under the D-range pressure is fed via the oil lines L-3 and L-18 and the neutral relay valve 64 and the oil line L-17 to the hydraulic servo C-1.

Here, the neutral relay valve 64, the linear solenoid valve 66, the C-1 control valve 67 and the hydraulic servo C-1 thus far described constitute the hydraulic control means 102 (FIG. 1).

Figure 7:
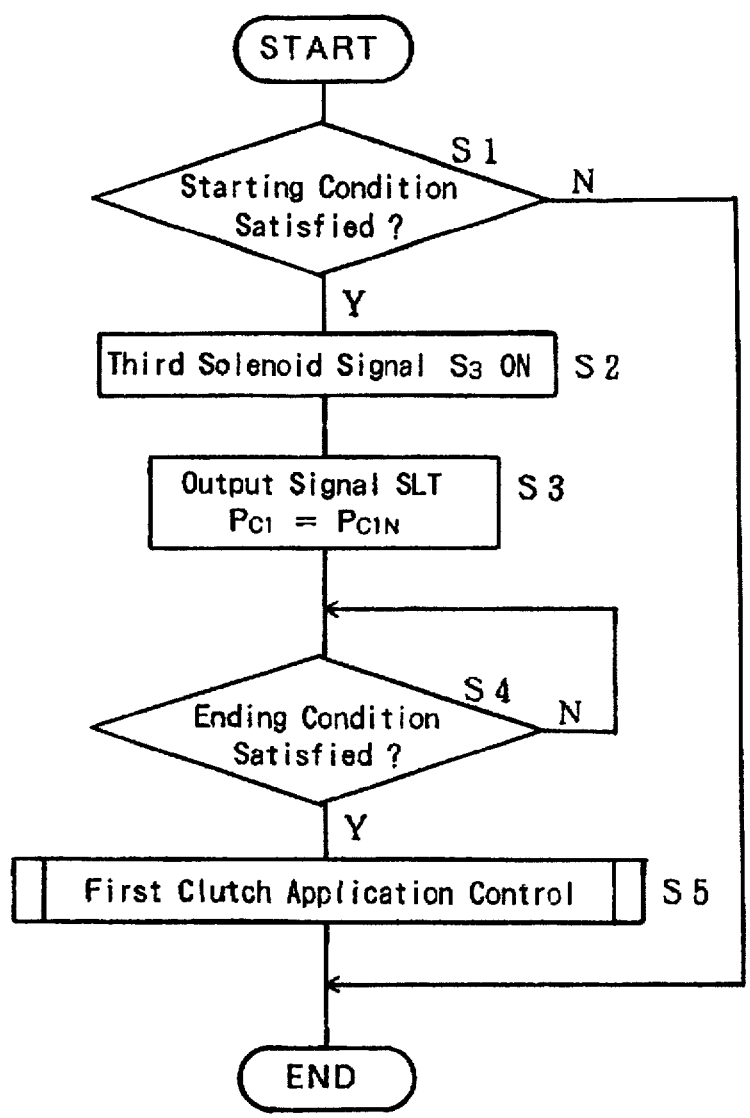
FIG. 7 is a main flow chart showing the operation of the control system for an automatic transmission in the first embodiment of FIGS. 1 and 4-6.

The operation of the control system of the first embodiment for an automatic transmission is shown in the main flow chart of FIG. 7.

Step S1: It is decided whether or not the condition for starting the neutral control is satisfied. The routine advances to Step S2, if the starting condition is satisfied, but is ended if NOT.

The starting condition is satisfied if all the following conditions are satisfied: that the engine 10 (FIG. 4) is in the idling state, that the throttle opening θ is fully closed, that the brake switch 48 is turned ON indicating that the brake pedal is depressed, that a forward running range is selected by the shift lever, and that the vehicle speed detected by the vehicle speed sensor 51 is not higher than a set value which is substantially zero so that the vehicle is substantially stopped. This starting condition is also the presence of the detected stopped state as detected by forward running range detector 42.

Step S2: A solenoid signal (as will be called the "third solenoid signal") S3 for opening/closing the solenoid valve S3 is turned ON. This third solenoid signal S3 is output as a change-over signal from the automatic transmission control unit 41.

Step S3: The release means 103 (FIG. 1) outputs a signal SLT to the linear solenoid valve 66 (FIG. 6)to set the C-1 oil pressure $P_{C1}$ to $P_{C1N}$. In this case, the first clutch releasing operation is executed to gradually reduce the C-1 oil pressure $P_{C1}$ to effect a sweep-down of clutch engagement, followed by the in-neutral operation in which the pressure is held to maintain the released state of the first clutch C1.

Step S4: The satisfaction of the condition for ending the neutral control is awaited.

In this case, it is decided that the ending condition is satisfied, if any of the following conditions is satisfied: that the engine 10 is not in the idling state; that the throttle opening θ is not fully closed; that the brake switch 48 is OFF; that the forward running range is not selected; and that the vehicle speed is not substantially zero. This ending condition is also the absence of a detected stopped state.

Step S5: The application means 104 controls the application of the first clutch.

Figure 8:
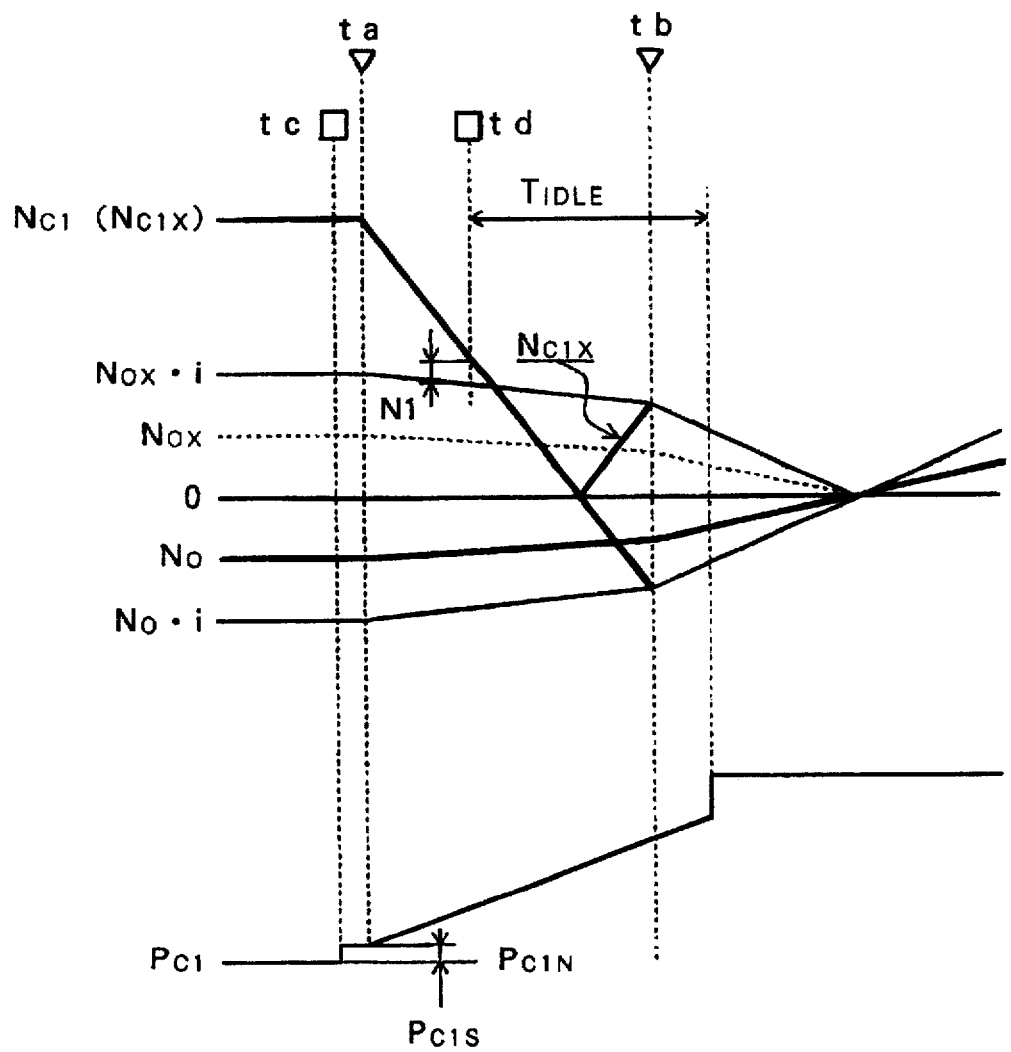
FIG. 8 is a first time chart of an operation of the control system for an automatic transmission in the first embodiment of FIGS. 1 and 4-7.
Figure 9:
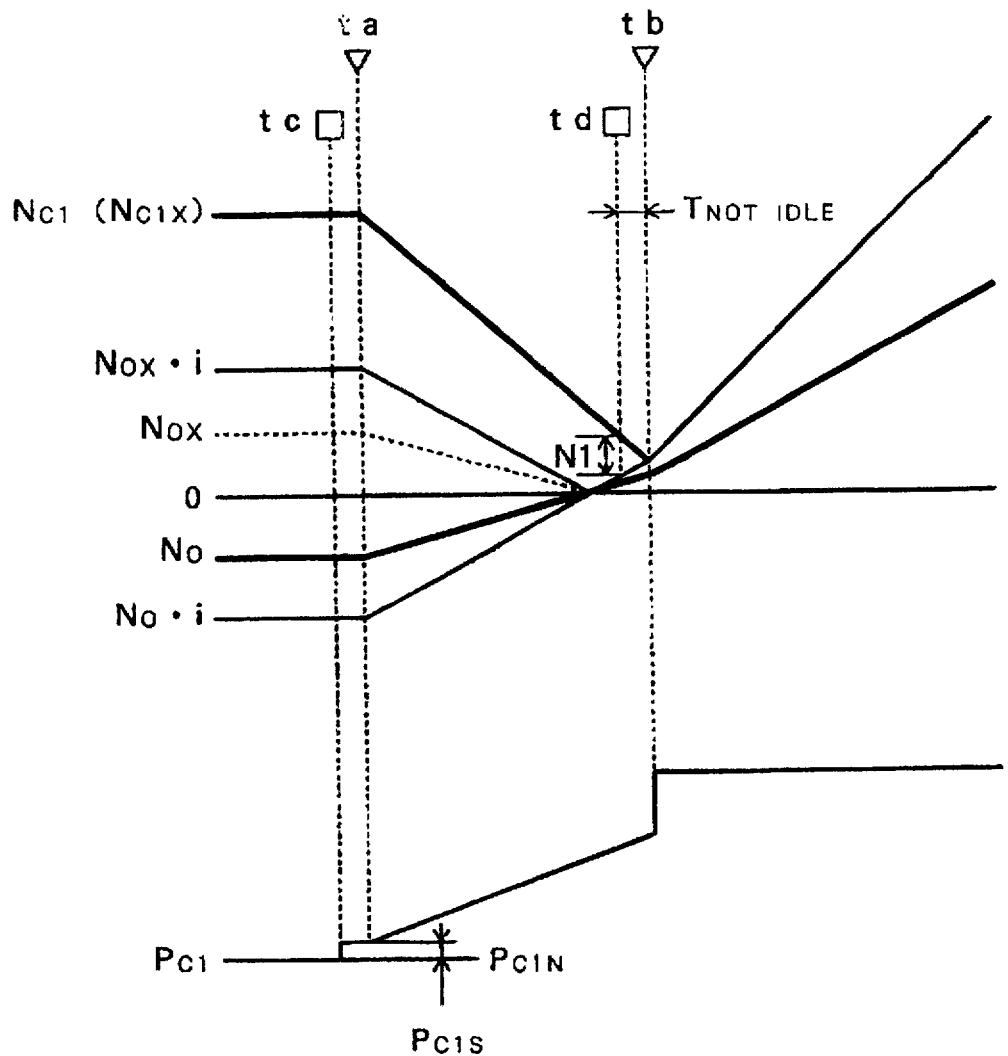
FIG. 9 is a second time chart of an operation of the control system for an automatic transmission in the first embodiment of FIGS. 1 and 4-7.
Figure 10:
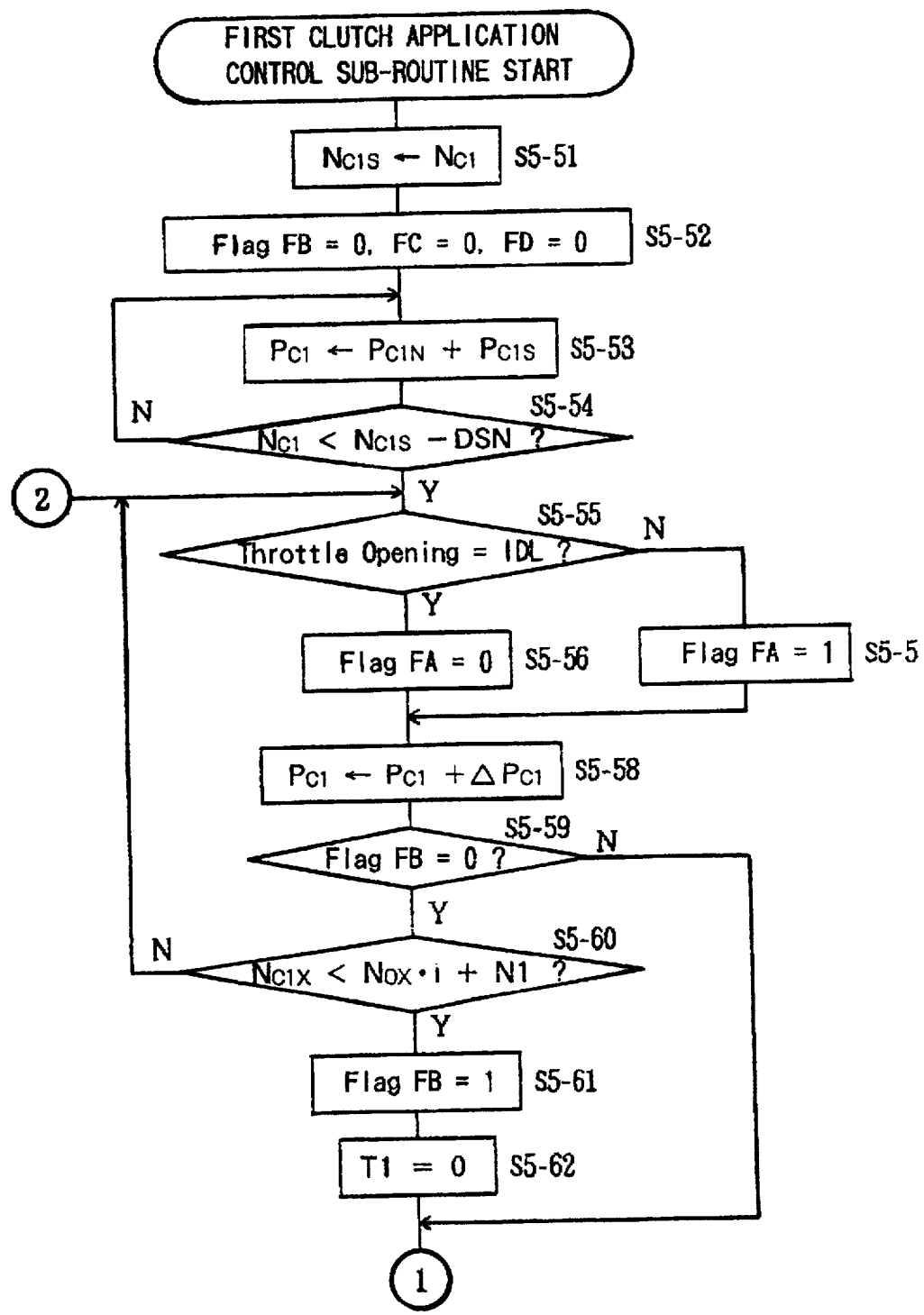
FIG. 10 is a flow chart illustrating a first portion of subroutine of a first clutch application control in the first embodiment of FIGS. 1 and 4-9.
Figure 11:
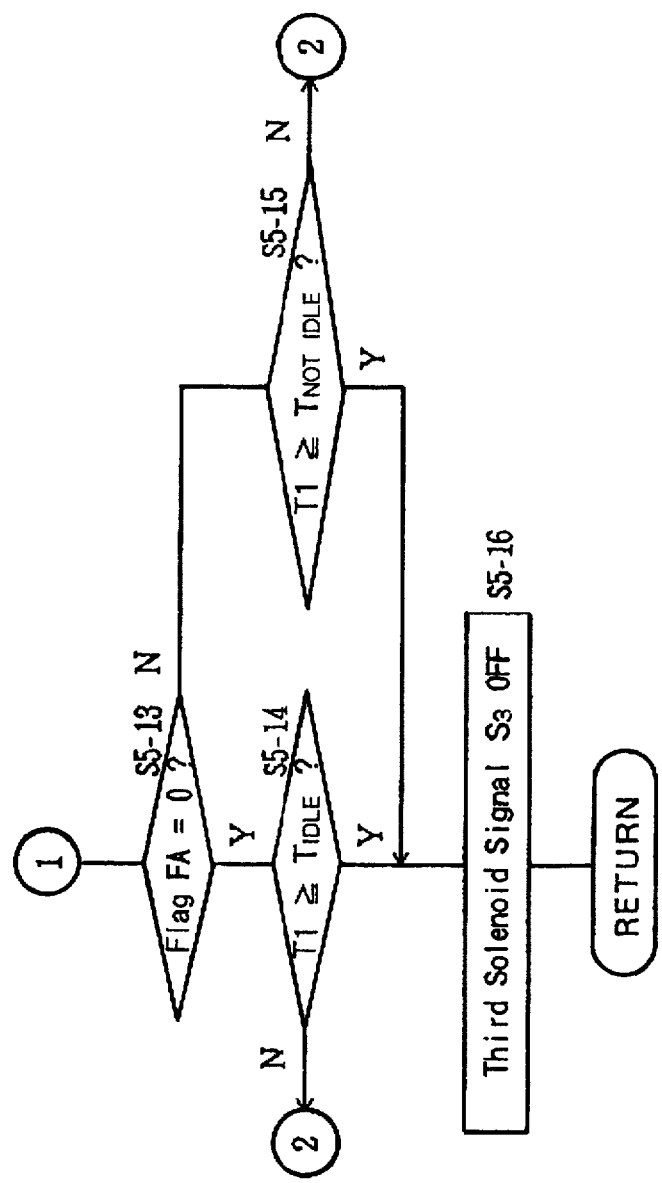
FIG. 11 is a flow chart illustrating a second portion of the subroutine of the first clutch application control in the first embodiment of FIGS. 1 and 4-9.
Figure 12:
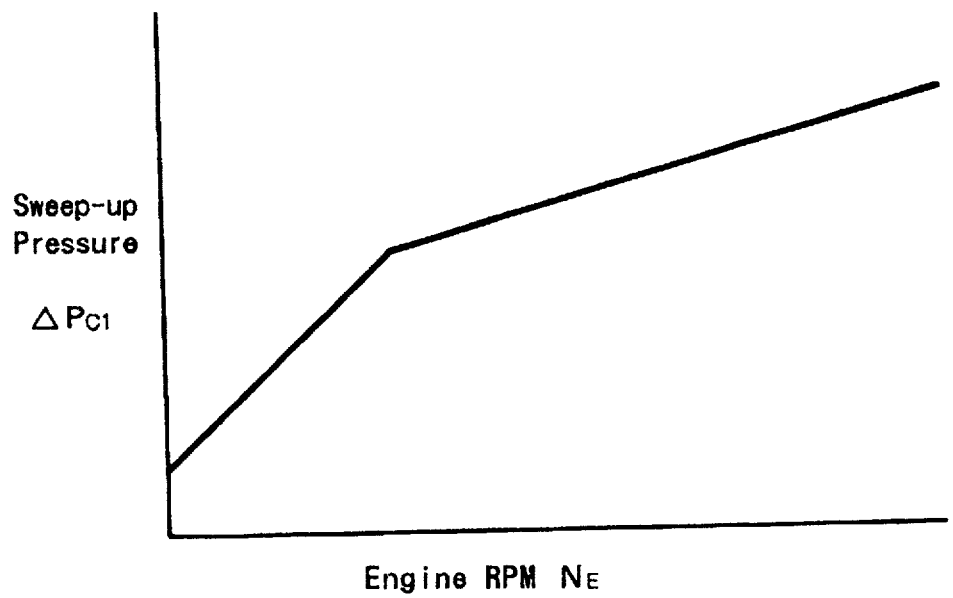
FIG. 12 is a diagram illustrating a sweep-up pressure map in the first embodiment of FIGS. 1 and 4-11.

The sub-routine of the first clutch application control of Step S5 of FIG. 7 can be understood from viewing the first time chart of FIG. 8, the second time chart of FIG. 9, the first portion of the sub-routine of a first clutch application control of FIG. 10, the second portion of the sub-routine of the first clutch application control of FIG. 11, and the diagram illustrating a sweep-up pressure map of FIG. 12. The abscissa of FIG. 12 indicates the engine RPM $N_E$, and the ordinate indicates a sweep-up pressure $\Delta P_{C1}$.

In FIGS. 8 and 9: reference letters ta designate a time for starting the engagement of the first clutch C1; letters tb designate a time for completion of the first clutch engagement; letters tc designate a time for the satisfaction of the ending condition of the neutral control; letters td designate a time for the satisfaction of the clutch engagement completion condition dictating the engagement completion of the first clutch C1 (FIG. 4); characters $N_O$ designate the output RPM; characters $N_{C1X}$ designate a detected input RPM detected by the RPM sensor 47; and characters $N_{OX}$ designate a detected output RPM detected by the vehicle speed sensor 51.

Additionally, characters $P_{C1}$ designate the C-1 oil pressure to be fed to the hydraulic servo C-1 (FIG. 6); characters $P_{C1N}$ designate the level of the C-1 oil pressure $P_{C1}$ immediately before the engagement of the firstclutch C1; characters $P_{C1S}$ designate a constant as a shelf pressure; characters N1 designate a set value; and characters $T_{IDLE}$ and $T_{NOT\ IDLE}$ designate set time periods.

In the present embodiment, the C-1 oil pressure $P_{C1}$ is set to the value $P_{C1N}$ if the ending condition of the neutral control is satisfied at the time tc. At the time ta, the engagement of the first clutch C1 is started by increasing the C-1 oil pressure $P_{C1}$ gradually to effect the sweep-up of the oil pressure. As engagement proceeds, the input RPM $N_{C1}$ drops, but the output RPM $N_O$ rises.

If the throttle opening θ is fully closed at the time ta, a decision of the clutch engagement completion condition may be erroneously made if the vehicle is moving backward. First of all, therefore, the C-1 oil pressure $P_{C1}$ is gradually raised before deciding whether or not the preset clutch engagement completion condition is satisfied. If this clutch engagement completion condition is satisfied at the time td, the C1 oil pressure $P_{C1}$ is abruptly raised upon elapse of the set time period $T_{IDLE}$ (the first set time period) from the time td. As a result of the time period $T_{IDLE}$, the C-1 oil pressure $P_{C1}$ is prevented from being abruptly raised in the course of the engagement of the first clutch C1, so that the application or engagement shock can be prevented from occurring.

When the throttle opening θ is fully closed the input torque to the speed change unit 16 does not significantly fluctuate. Even with a delay in the decision of the clutch engagement completion, the first clutch C1 does not slip.

On the other hand, if the throttle opening θ is not fully closed at the time ta, that is, if the accelerator pedal is depressed, a relative high torque is transmitted to the speed change unit 16 as the engagement of the first clutch C1 starts, so that the output torque of the vehicle increases. Thus, even if the vehicle is moving backward at the instant of applying the first clutch C1, the output torque acts to prevent the backward movement of the vehicle quickly. As a result, the decision of the clutch engagement completion is not mistaken by the backward movement of the vehicle.

If the throttle opening θ is not fully closed at the time ta, the C-1 oil pressure $P_{C1}$ is gradually raised at first, and it is decided whether or not the preset clutch engagement completion condition is satisfied. If this clutch engagement completion condition is satisfied at the time td, the C-1 oil pressure P is abruptly raised.

In the present embodiment, as shown in FIG. 9, the clutch engagement completion of the first clutch C1 is decided at the time td from which the set time period $T_{NOT\ IDLE}$ extends. The clutch engagement completion condition is satisfied if the detected input RPM $N_{C1X}$ is smaller than the sum of the product $N_{OX}$ times i plus N1 wherein the detected output RPM is $N_{OX}$, the gear ratio of the speed change unit 16 is i and a set value is N1, as follows:

$$N_{C1X} < N_{OX} \cdot i + N_1.$$

Hence, the clutch engagement completion condition is satisfied if the first clutch C1 is calculated to substantially become fully engaged immediately before the end of its engagement completion.

As a result, the first clutch C1 does not slip even if the input torque to the speed change unit 16 fluctuates with the depression of the accelerator pedal.

Thus, the first clutch C1 will never slip even if the input torque to the speed change unit 16 fluctuates, so that the decision of the clutch engagement completion cannot be mistaken and application shock is prevented.

ECU program steps are set forth in FIGS. 10 and 11.

Step S5-1: The input RPM $N_{C1}$ at the time tc for the satisfaction of the ending condition of the neutral control is saved as the initial RPM $N_{C1S}$.

Step S5-2: A flag FB is set to 0.

Step S5-3: The constant $P_{C1S}$ is added to the value $P_{C1N}$, and the resultant sum is set to the C-1 oil pressure $P_{C1}$.

Step S5-4: It is decided whether or not the input RPM $N_{C1}$ is smaller than the difference of the initial RPM $N_{C1S}$ minus a constant DSN. In other words, it is decided whether or not the engagement of the first clutch C1 has been started. The routine advances to Step S5-5, if the input RPM $N_{C1}$ is smaller than the difference of the initial RPM $N_{C1S}$ minus the constant DSN, but returns to Step S5-3 if the input RPM $N_{C1}$ is more than the difference of the initial RPM $N_{C1S}$ minus the constant DSN.

Step S5-5: It is decided whether or not the throttle opening θ is in the fully closed state (IDL). The routine advances to Step S5-6, if the throttle opening θ is fully closed, but to Step S5-7 if not fully closed.

Step S5-6: The flag FA is set to an idle ON state (0).

Step S5-7: The flag FA is set to an idle OFF state (1).

Step S5-8: The gradual raising means 105 (FIG. 1) increases the C-1 oil pressure $P_{C1}$. Specifically, with reference to the sweep-up pressure map of FIG. 12, the sweep-up pressure $\Delta P_{C1}$ is added to the C-1 oil pressure $P_{C1}$, and the resultant sum is set as the C-1 oil pressure $P_{C1}$. By repeating this Step S58, the C-1 oil pressure $P_{C1}$ is gradually raised.

Step S5-9: It is decided whether or not the flag FB is 0. The routine advances to Step S5-10, if the flag FB is 0, but to Step S5-13 if the flag FB is not 0.

Step S5-10: The clutch engagement completion condition satisfaction deciding means 106 decides whether or not the clutch engagement completion condition is satisfied, on the basis of the detected output RPM $N_{OX}$, the detected input RPM $N_{C1X}$ and the gear ratio i of the target gear stage. In this case, the RPM at the output side of the first clutch C1 is estimated to be the product $N_{OX} \cdot i$ which is calculated by multiplying the detected output RPM $N_{OX}$ by the gear ratio i of the speed change unit 16. Hence, the clutch engagement completion condition is whether or not the detected input RPM $N_{C1X}$ is smaller than the sum of the value $N_{OX} \cdot i$ and the set value N1, as follows:

$$N_{C1X} < N_{OX} \cdot i + N_1.$$

If the detected input RPM $N_{C1X}$ is smaller than the sum of the value $N_{OX} \cdot i$ and the set value N1, the clutch engagement completion condition is satisfied at the time td. Hence, it is decided that the engagement of the first clutch C1 has been ended, and the routine advances to Step S5-11. If the detected input RPM $N_{C1X}$ is larger than the sum of the value $N_{OX}$·i and the set value N1, the routine returns to Step S5-5.

Step S5-11: The flag FB is set to 1.

Step S5-12: The time T1, as measured by the not-shown timer packaged in the automatic transmission control unit 41, is set to 0.

Step S5-13: It is decided whether or not the flag FA is in the idle ON state. The routine advances to Step S5-14, if the flag FA is in the idle ON state, and to Step S5-15 if the flag FA is not in the idle ON state.

Step S5-14: It is decided whether or not the time T1 measured by the timer is equal to or longer than the set time period $T_{IDLE}$ if the flag FA is in the idle ON state. The routine advances to Step S5-16, if the time T1 is equal to or longer than the set time period $T_{IDLE}$, but returns to Step S5-5 if the set time T1 is shorter than the set time period $T_{IDLE}$. In this case, the set time period $T_{IDLE}$ is set to such a large value, e.g., 0.4 seconds that the engagement of the first clutch C1 is ended without fail.

Step S5-15: It is decided whether or not the time T1 by the timer is equal to or longer than the set time period $T_{NOT IDLE}$ if the flag FA is not in the idle ON state, i.e., the accelerator pedal is depressed. The routine advances to Step S5-16, if the time T1 is equal to or longer than the set time period $T_{NOT IDLE}$ but returns to Step S5-5 if the time T1 is shorter than the set time period $T_{NOT IDLE}$. In this case, the set time period $T_{NOT IDLE}$ is set as short as 0.05 seconds, and is made to correspond to the time period necessary for equalizing the detected input RPM $N_{C1X}$ and the value $N_{OX}$·i after the following relationship has been satisfied, because the detected input RPM $N_{C1X}$ is compared at Step S5-11 with the sum of the value $N_{OX}$·i and the set value N1:

$$N_{C1X} < N_{OX} \cdot i + N1.$$

If the instant at which the detected input RPM $N_{C1X}$ and the value $N_{OX}$·i become equal is detected at Step S5-11, it is unnecessary for awaiting the elapse of the set time period $T_{NOT IDLE}$. Generally speaking, however, the RPM cannot be accurately detected at all times due to the various errors. This may make it impossible to detect the equalization of the detected input RPM $N_{C1X}$ and the value $N_{OX}$·i. Thus, the set value N1 and the set time period $T_{NOT IDLE}$ are set to decide the engagement completion of the first clutch C1. If the flag FA is not in the idle ON state at Step S5-13, the routine advances to Step S5-16 not via Step S5-14.

Step S5-16: The abrupt raising means 107 ends the abrupt rise by turning OFF the third solenoid signal S3 for turning ON/OFF the solenoid valve S3, and increases the C-1 oil pressure $P_{C1}$ abruptly.

Figure 13:
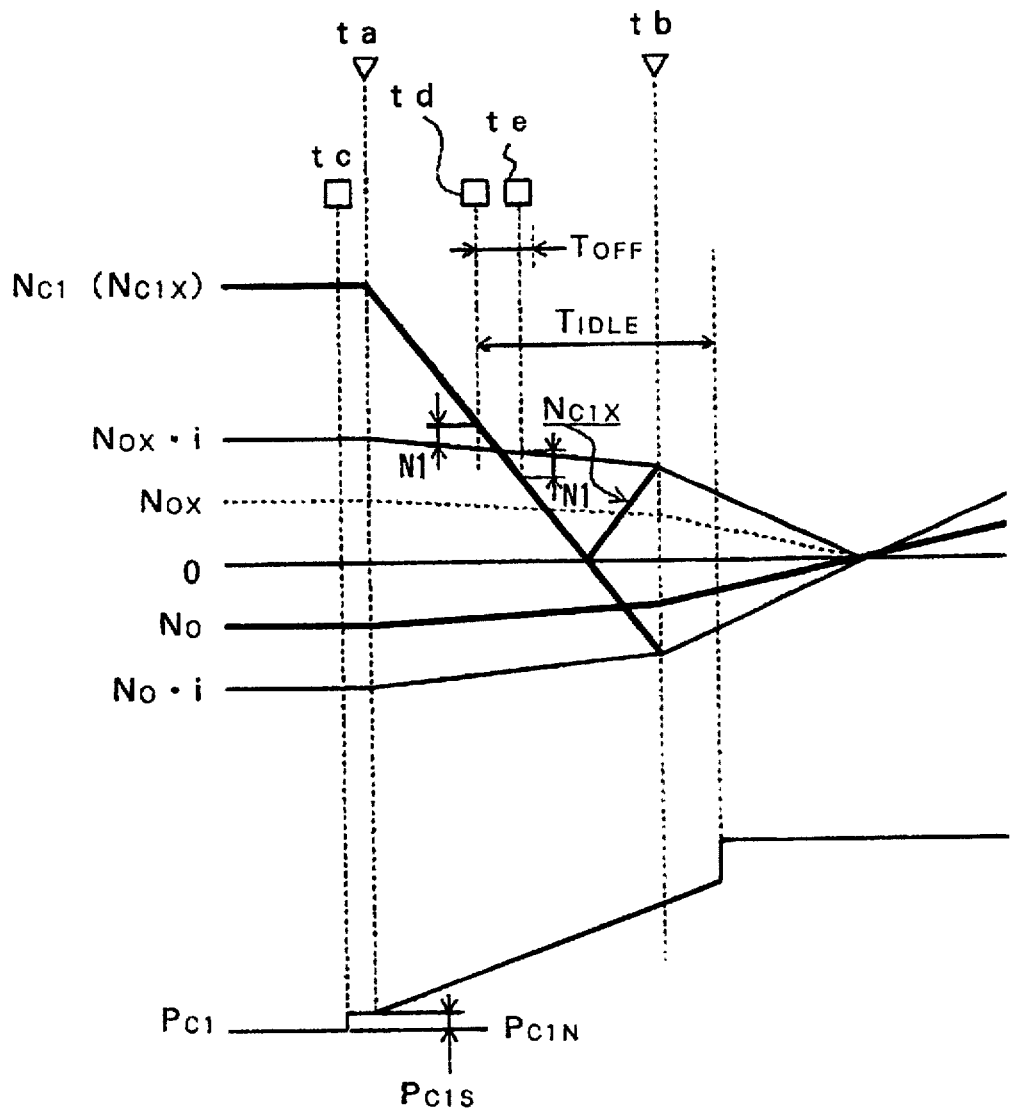
FIG. 13 is a time chart of an operation of a control system for an automatic transmission in a second embodiment of the present invention.
Figure 14:
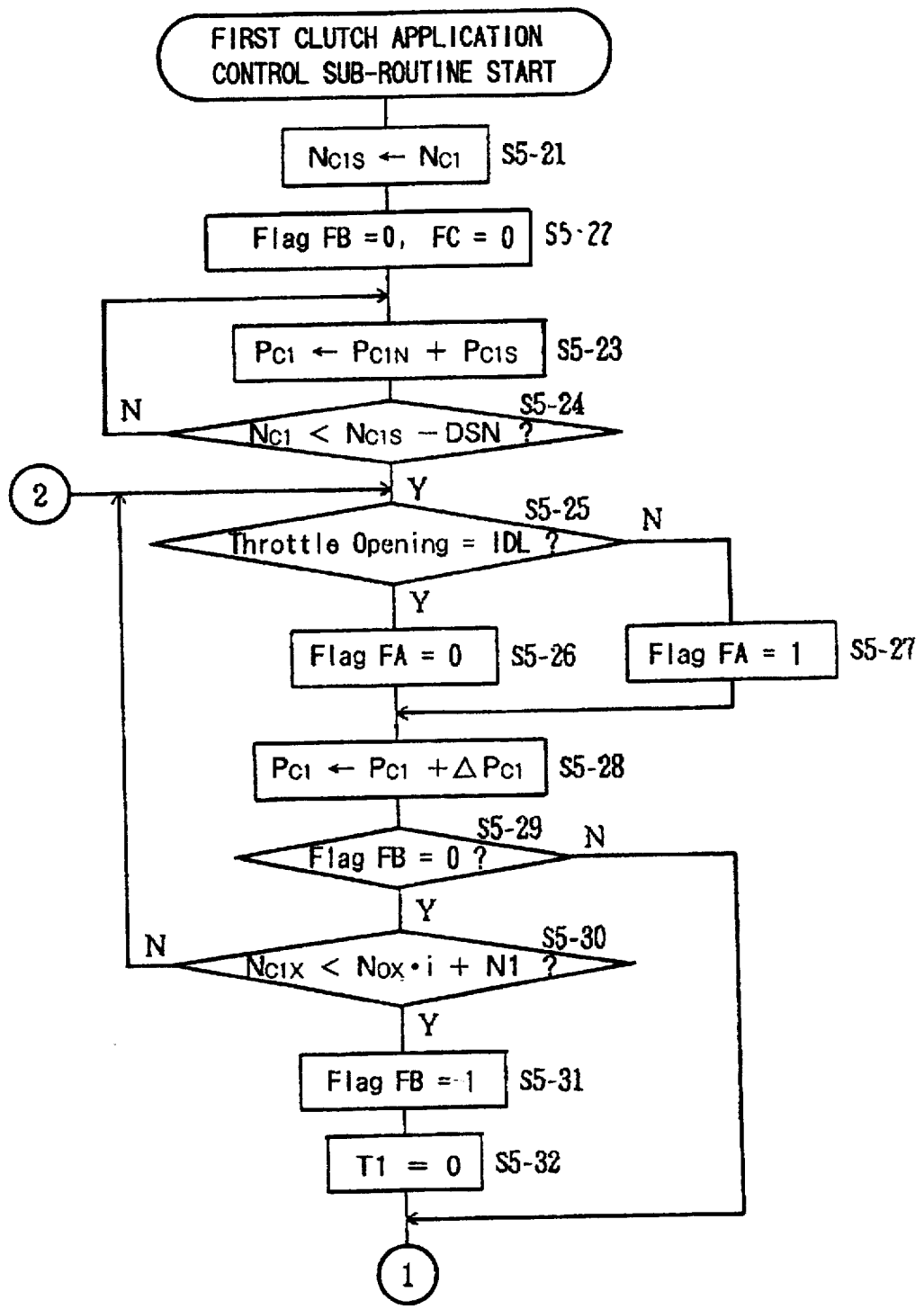
FIG. 14 is a first flow chart illustrating a subroutine of a first clutch application control in the second embodiment of the present invention.
Figure 15:
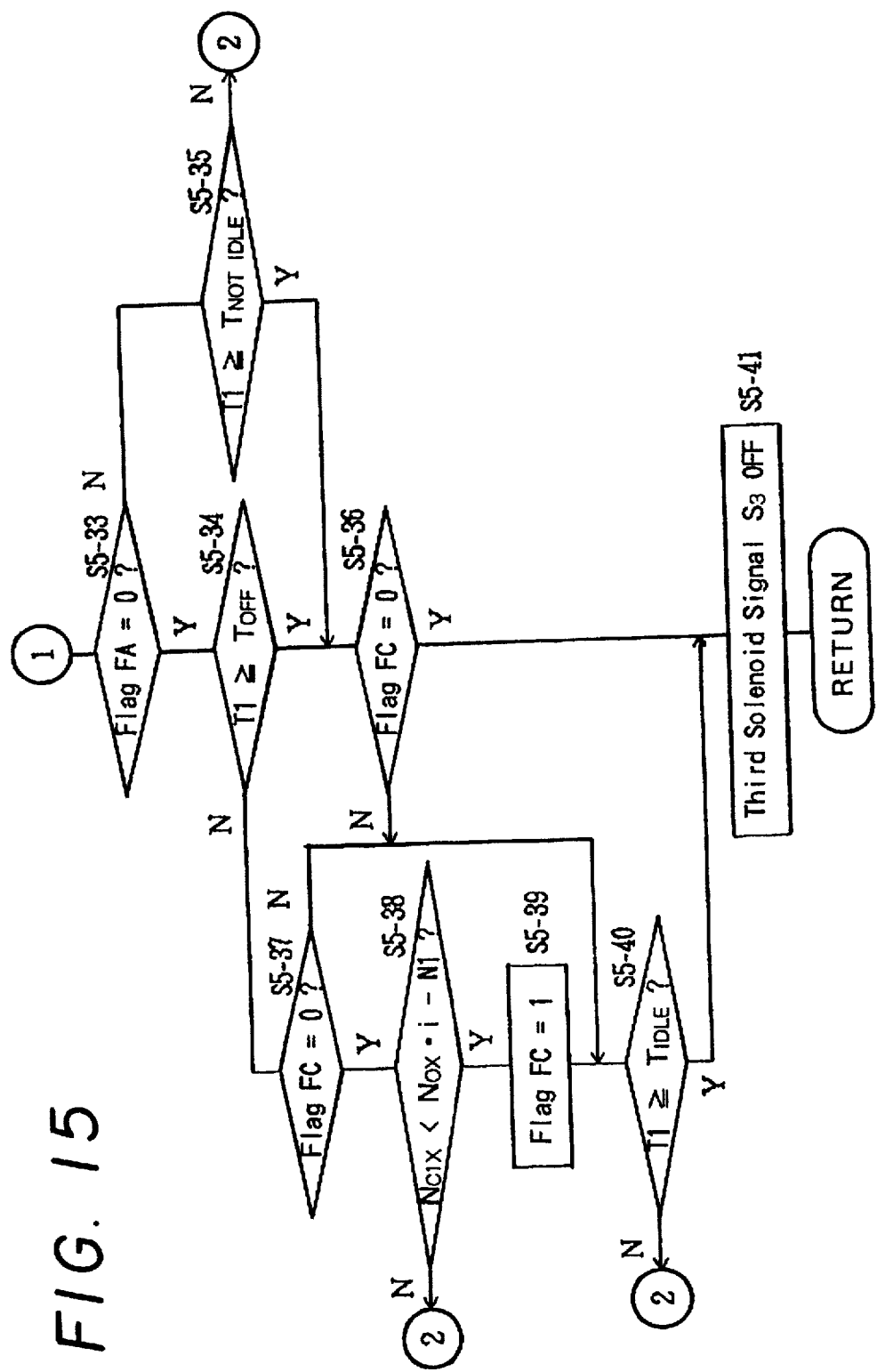
FIG. 15 is a second flow chart illustrating a subroutine of the first clutch application control in the second embodiment of the present invention.

A second embodiment is illustrated by the time chart of a control system for an automatic transmission in FIG. 13, the first diagram illustrating the first portion of the subroutine of the first clutch application control in FIG. 14, and the second diagram illustrating the second portion of the subroutine of the first clutch application control in FIG. 15.

In FIG. 13: reference letters ta designate a time for starting the application (clutch engagement); letters tb designate a time for ending the application; letters designate tc a time for the satisfaction of ending condition of the neutral control; letters td designate a time for the satisfaction of the clutch engagement completion condition; letters te designate a time for the satisfaction of the application standby condition; characters $N_0$ designate the output RPM; characters $N_{C1X}$ designate a detected input RPM detected by the RPM sensor 47 (FIG. 4); and characters $N_{OX}$ designate a detected output RPM detected by the vehicle speed sensor 51.

Characters $P_{C1}$ designate the C-1 oilpressure to be fed to the hydraulic servo C-1; characters PC1N designate the level of the C-1 oil pressure $P_{C1}$ immediately before the application of the first clutch C1; characters $P_{C1S}$ designate a constant as a shelf pressure; characters N1 a set value; and characters $T_{IDLE}$ and $T_{OFF}$ designate set time periods. The set time period $T_{OFF}$ is set as a first set time period.

In this second embodiment, the C-1 oil pressure $P_{C1}$ is set to the value $P_{C1N}$ if the ending condition of the neutral control is satisfied at the time tc. At the time ta, the operation of engaging the first clutch C1 is started by increasing the C-1 oil pressure $P_{C1}$ gradually to effect the sweep-up of the C-1 oil pressure. During the engagement procedure, the input RPM $N_{C1}$ drops, and the output RPM $N_0$ rises. If the throttle opening θ is not fully closed at the time ta, that is, if the not-shown accelerator pedal is depressed, a relative high torque is transmitted to the speed change unit 16 as the engagement of the first clutch C1 starts, so that the output torque of the vehicle increases. Thus, even if the vehicle is moving backward at the instant of applying the first clutch C1, the output torque acts to prevent the backward movement of the vehicle quickly. As a result, the decision of the engagement completion is not made erroneous by the backward movement of the vehicle.

If, therefore, the throttle opening θ is not fully closed at the time ta, the C-1 oil pressure $P_{C1}$ is gradually raised at first, as in FIG. 9, and it is decided whether or not the preset clutch engagement completion condition is satisfied. If this clutch engagement completion condition is satisfied at the time td, the C-1 oil pressure $P_{C1}$ is abruptly raised when the set time period $T_{NOT IDLE}$ has elapses from the time td.

The C-1 oil pressure $P_{C1}$ can also be abruptly raised at the instant of satisfying the clutch engagement completion condition, i.e., at the time td.

The clutch engagement completion condition is satisfied if the detected input RPM $N_{C1X}$ is smaller than the sum of the value $N_{OX}$·i and the set value N1, as follows:

$$N_{C1X} < N_{OX} \cdot i + N1.$$

Hence, the clutch engagement completion condition is satisfied if the first clutch C1 is calculated to become fully engaged immediately before the end of its engagement procedure.

As a result, the first clutch C1 does not slip even if the input torque to the speed change unit 16 fluctuates with the depression of the accelerator pedal.

If the throttle opening θ is fully closed, onthe other hand, the decision of the engagement completion may be made erroneously if the vehicle is moving backward. As shown in FIG. 13, therefore, it is decided whether or not the application standby condition is satisfied, by the time the set time period $T_{OFF}$ elapses after the clutch engagement completion condition has been satisfied. In this case, the application standby condition is whether or not the detected input RPM $N_{C1X}$ is smaller than the difference of the value $N_{OX}$·i minus the set value N1, as follows:

$$N_{C1X} < N_{OX} \cdot i - N1.$$

If the application standby condition is satisfied before the set time period $T_{OFF}$ (the first set time period) elapses, it is found that the vehicle is moving backward. Hence, the C-1 oil pressure $P_{C1}$, is abruptly raised when the set time period $T_{IDLE}$ (the second set time period) elapses after the clutch engagement completion condition has been satisfied. This makes it possible to prevent the C-1 oil pressure P from being abruptly raised in the course of clutch engagement and accordingly prevents application shock from occurring during engagement of the first clutch C1.

On the other hand, the set time period $T_{OFF}$ (the first set time period) is set to correspond to a time period during which the first clutch C1 is calculated to be substantially less than fully engaged immediately after satisfaction of the clutch engagement completion condition after the start of the first clutch engagement procedure and before the end of the engagement procedure, and the set time period $T_{IDLE}$ is set to correspond to end of the engagement procedure of the first clutch C1.

If the application standby condition is not satisfied during the set time period $T_{OFF}$, it is found that the vehicle is not moving backward. Hence, the C-1 oil pressure $P_{C1}$ is abruptly raised when the set time period $T_{OFF}$ elapses. This makes it possible to prevent the rise in the C-1 oil pressure $P_{C1}$ from being delayed more than necessary.

Thus, the first clutch C1 does not slip even when the input torque to the speed change unit 16 fluctuates, so that the decision of the engagement completion cannot be erroneous and application shock is prevented.

ECU program steps used in the second embodiment are set forth in the flow charts of FIGS. 14 and 15.

Step S5-21: The input RPM $N_{C1}$ at the time tc for the satisfaction of the ending condition of the neutral control is stored as the initial RPM $N_{C1S}$.

Step S5-22: Flags FB and FC are set to 0.

Step S5-23: The constant $P_{C1S}$ is added to the value $P_{C1N}$ and the resultant sum is used as the new C-1 oil pressure $P_{C1}$.

Step S5-24: It is decided whether or not the input RPM $N_{C1}$ is smaller than the difference of the initial RPM $N_{C1S}$ minus a constant DSN. The routine advances to Step S5-25, if the input RPM $N_{C1}$ is smaller than the difference of the initial RPM $N_{C1S}$ minus the constant DSN, but returns to Step S5-23 if the input RPM $N_{C1}$ is more than the difference of the initial RPM $N_{C1S}$ minus the constant DSN to further increase the oil pressure at Step S5-23. This Step S5-24 determines when actual engagement of the clutch C1 begins and will not proceed to Step S5-25 until the beginning of actual clutch engagement is determined.

Step S5-25: It is decided whether or not the throttle opening θ is in the fully closed state (IDL). The routine advances to Step S5-26, if the throttle opening θ is fully closed, but to Step S5-27 if not fully closed.

Step S5-26: The flag FA is set to an idle ON state (0).

Step S5-27: The flag FA is set to an idle OFF state (1).

Step S5-28: The gradual raising means 105 (FIG. 1) raises the C-1 oil pressure $P_{C1}$. Specifically, the sweep-up pressure $\Delta P_{C1}$ is added to the C-1 oil pressure $P_{C1}$ and the resultant sum is set as the C-1 oil pressure $P_{C1}$. By repeating this Step S5-28,the C-1 oil pressure $P_{C1}$ can be gradually raised.

Step S5-29: It is decided whether or not the flag FB is 0. The routine advances to Step S5-30,—if the flag FB is 0, but to Step S5-33 if the flag FB is not 0.

Step S5-30: The clutch engagement completion condition satisfaction deciding means 106 decides whether or not the clutch engagement completion condition is satisfied, on the basis of the detected output RPM $N_{OX}$, the detected input RPM $N_{C1X}$ and the gear ratio of the target gear range. In this case, the clutch engagement completion condition is whether or not the detected input RPM $N_{C1X}$ is smaller than the sum of the value $N_{OX}\cdot i$ and the set value N1, as follows:

$$N_{C1X} < N_{OX}\cdot i + N1.$$

If the detected input RPM $N_{C1X}$ is smaller than the sum of the value $N_{OX}\cdot i$ and the set value N1, the clutch engagement completion condition is satisfied at the time td. Hence, it is decided that the engagement procedure of the first clutch C1 has been ended, and the routine advances to Step S5-31. If the detected input RPM $N_{C1X}$ is larger than the sum of the value $N_{OX}\cdot i$ and the set value N1, the routine returns to Step S5-25 to continue the gradual increase of the C-1 oil pressure $P_{C1}$ in Step S5-28.

Step S5-31: The flag FB is set to 1.

Step S5-32: The time T1, as measured by a timer (not shown) in the automatic transmission control unit 41, is set to 0.

Step S5-33: It is decided whether or not the flag FA is in the idle ON state. The routine advances to Step S5-34, if the flag FA is in the idle ON state, and to Step S5-35 if the flag FA is not in the idle ON state.

Step S5-34: It is decided whether or not the time T1 measured by the timer is equal to or longer than the set time period $T_{OFF}$ when the flag FA is 0, i.e., the throttle is in its fully closed position. The routine advances to Step S5-36, if the time T1 is equal to or longer than the set time period $T_{OFF}$ but to Step S5-37 if the time T1 is shorter than the set time period $T_{OFF}$. The set time period $T_{OFF}$, such as 0.1 seconds, is set to about twice as long as the set time period $T_{NOT\ IDLE}$. Here, the set time period $T_{OFF}$ is set to correspond to the time period after the following relationship has been satisfied at Step S5-30:

$$N_{C1X} < N_{OX}\cdot i + N1$$

and before the following relationship is satisfied at Step S5-38:

$$N_{C1X} < N_{OX}\cdot i - N1.$$

Step S5-35: It is decided whether or not the time T1 by the timer is equal to or longer than the set time period $T_{NOT\ IDLE}$ when the flag FA is not in the idle ON state. The routine advances to Step S5-36, if the time T1 is equal to or longer than the set time period $T_{NOT\ IDLE}$, but returns to Step S5-25 if the time T1 is shorter than the set time period $T_{NOT\ IDLE}$. The set time period $T_{NOT\ IDLE}$ is set as short as 0.05 seconds. If, therefore, the flag FA is not in the idle ON state at Step S5-33, the routine can also advance to the Step S5-36 not via Step S5-35.

Step S5-36: It is decided whether or not the flag FC is 0. The routine advances to Step S5-41, if the flag FC is 0, and to Step S5-40 if the flag FC is not 0.

Step S5-37: It is decided whether or not the flag FC is 0. The routine advances to Step S5-38, if the flag FC is 0, and to Step S5-40 if the flag FC is not 0.

Step SS-38: The application standby condition satisfaction deciding means decides whether or not the application standby condition is satisfied, on the basis of the detected output RPM $N_{OX}$, the detected input RPM $N_{C1X}$ and the gear ratio of the target gear stage. In particular, the application standby condition is whether or not the detected input RPM $N_{C1X}$ is smaller than the difference of the value $N_{OX}\cdot i$ minus the set value N1, as follows:

$$N_{C1X} < N_{OX}\cdot i - N1.$$

If the detected input RPM $N_{C1X}$ is smaller than the difference of the value $N_{OX}\cdot i$ minus the set value N1, the application standby condition is satisfied at thetime te. Hence, it is decided that the completion of the engagement of the first clutch C1 is to be ended after the longer time period $T_{IDLE}$ and the routine advances to Step S5-39. If the detected input RPM $N_{C1X}$ is larger than the difference of the value $N_{OX}\cdot i$ minus the set value N1, the routine returns to Step S5-25.

When the application standby condition is satisfied, the engagement of the first clutch C1 is not actually ended, but the backward movement of the vehicle causes misjudgment of the clutch engagement completion by the finding of satisfaction of the engagement completion indicated by the following relationship at Step S5-30:

$$N_{C1X} < N_{ox} \cdot i + N1.$$

but however this misjudgment is corrected by finding that the following relationship is satisfied:

$$N_{C1X} < N_{ox} \cdot i - N1.$$

Thus, the backward movement of the vehicle can be detected by the application standby condition to prevent early abrupt increase in oil pressure and any corresponding application shock caused by early termination of the gradual oil pressure increase.

Step S5-39: The flag FC is set to 1.

Step S5-40: It is decided whether or not the time T1 measured by the timer is longer than the set time period $T_{IDLE}$. The routine advances to Step S5-41, if the time Ti is longer than the set time period $T_{IDLE}$, but returns to Step S5-25 if the time T1 is shorter than the set time period $T_{IDLE}$. The set time period $T_{IDLE}$ is set as long as 0.4 seconds to avoid early abrupt increase in the oil pressure to the servo for the clutch C1.

Step S5-41: The abrupt raising means 107 turnsOFF the third solenoid signal S3 for opening/closing the solenoid valve S3.

Figure 16:
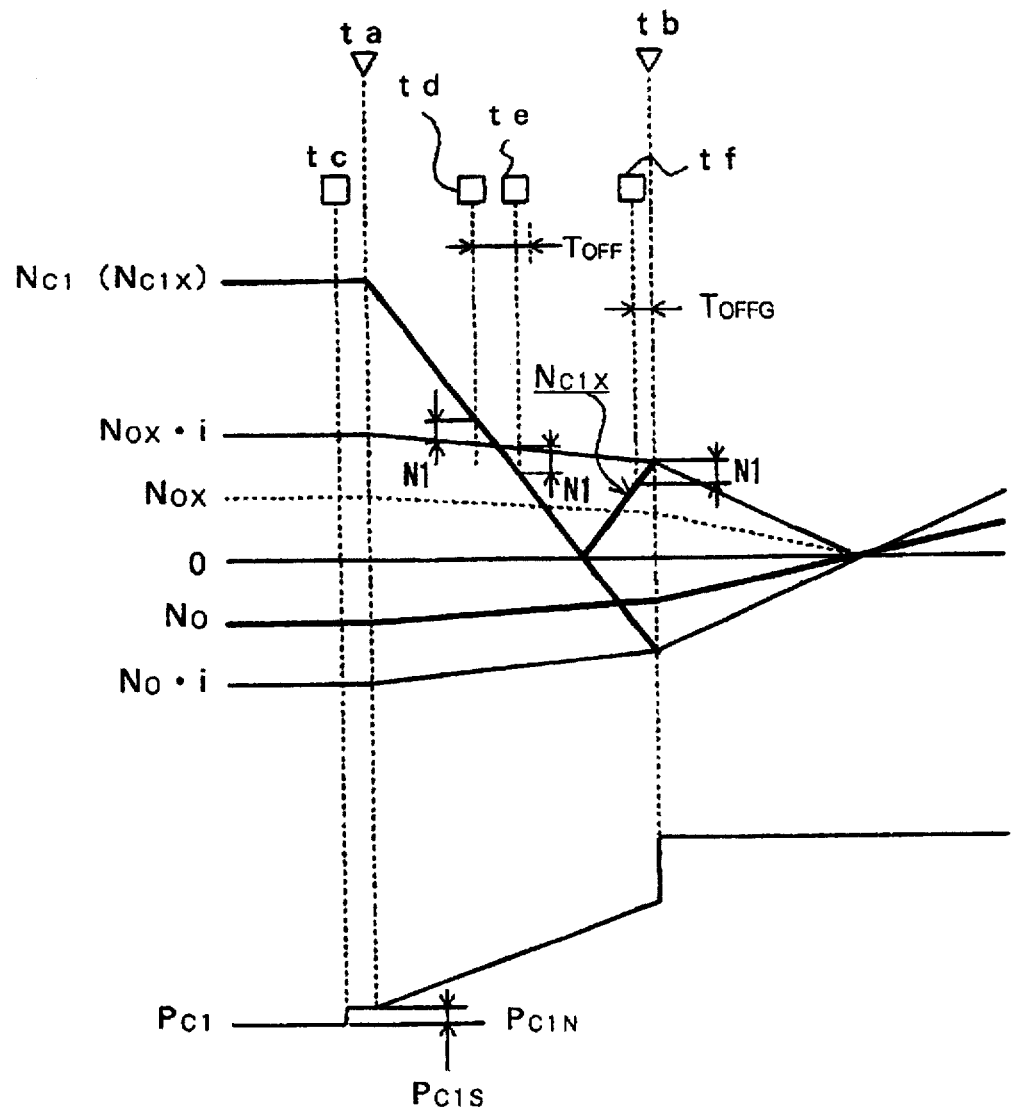
FIG. 16 is a time chart of an operation of a control system for an automatic transmission in a third embodiment of the present invention.
Figure 17:
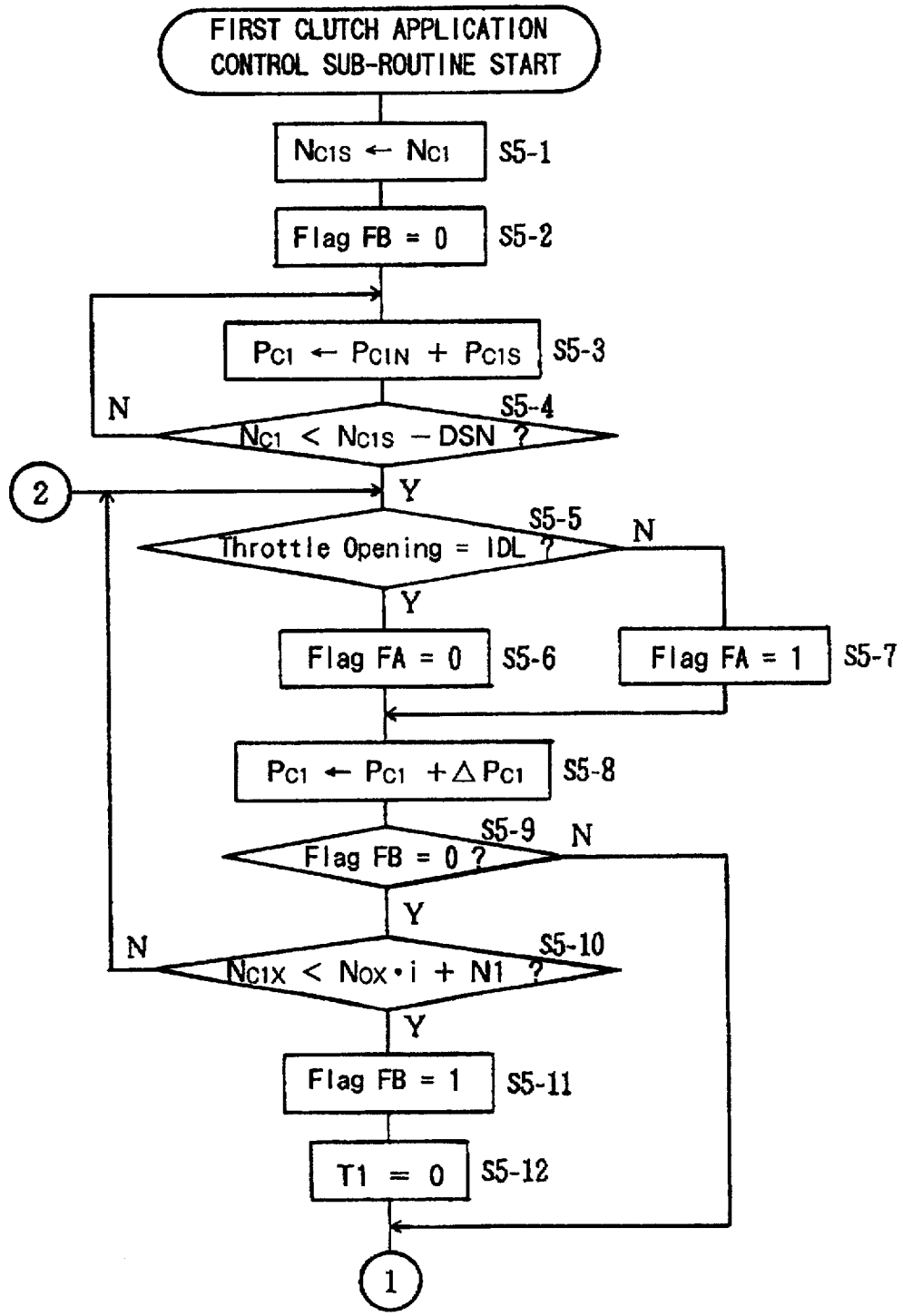
FIG. 17 is a first flow chart illustrating a subroutine of a first clutch application control in the third embodiment of the present invention.
Figure 18:
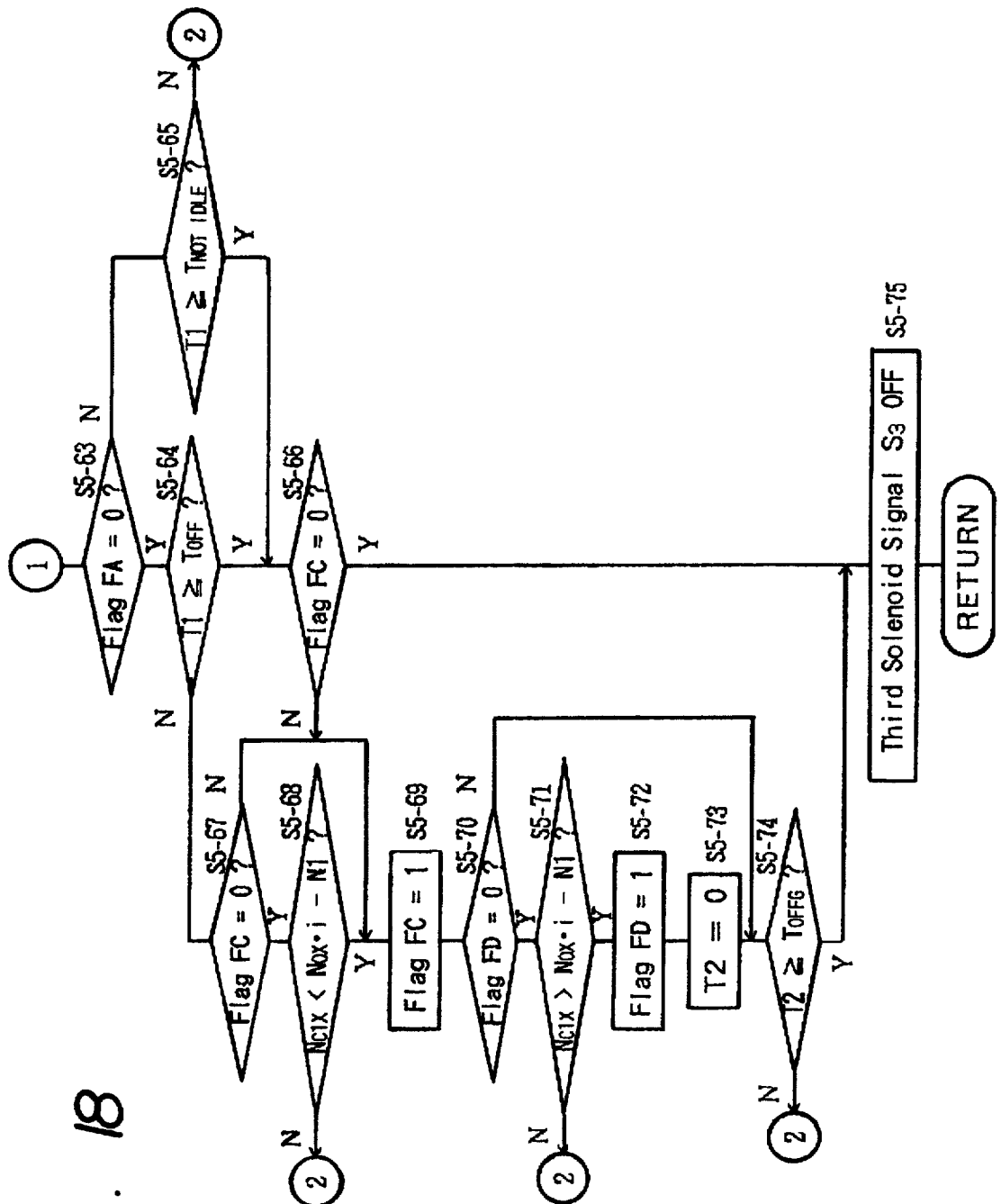
FIG. 18 is a second flow chart illustrating a subroutine of the first clutch application control in the third embodiment of the present invention.

A third embodiment of the present invention is illustrated by: the time chart of a control system for an automatic transmission in FIG. 16; the first diagram illustrating a first portion of a sub-routine of the first clutch application control in FIG. 17; and the second diagram illustrating a second portion of the subroutine of the first clutch application control in FIG. 18.

In FIG. 16: reference letters ta designate a time for starting the clutch engagement procedure; letters tb designate a time for ending the clutch engagement procedure; letters tc a time for the satisfaction of ending condition of the neutral control; letters td designate a time for the satisfaction of the first clutch engagement completion condition; letters te designate a time for the satisfaction of the application standby condition; letters tf designate a time for the satisfaction of a second clutch engagement completion condition; characters $N_O$ designate the output RPM; characters $N_{C1X}$ designate a detected input RPM detected by the RPM sensor 47 (FIG. 4); and characters $N_{OX}$ designate a detected output RPM detected by the vehicle speed sensor 51.

Characters $P_{C1}$ designate the C-1 oil pressure to be fed to the hydraulic servo C-1; characters PC1N designate the level of the C-1 oil pressure $P_{C1}$ immediately before the application of the first clutch C1; characters $P_{C1S}$ designate a constant as a shelf pressure; characters N1 designate a set value; and characters $T_{IDLE}$ and $T_{OFF}$ designate set time periods. The set time period $T_{OFF}$ is a first set time period, and the set time period $T_{OFFG}$ is a second set time.

The C-1 oil pressure $P_{C1}$ is set to the value $P_{C1N}$ if the ending condition of the neutral control is satisfied at the time tc. At the time ta, the engagement procedure of the first clutch C1 is started by increasing the C-1 oil pressure $P_{C1}$ gradually to effect sweep-up of the oil pressure. In accordance with this, the input RPM $N_{C1}$ drops, but the output RPM $N_O$ rises.

Subsequently, if the first clutch engagement completion condition is satisfied at the time td, it is decided whether or not the application standby condition is satisfied by the time the set time period $T_{OFF}$ elapses. If the application standby condition is satisfied at the time te, then the satisfaction of the second clutch engagement completion condition is awaited.

Next, if the second clutch engagement completion conditionis satisfied at the time tf, the C-1 oil pressure $P_{C1}$ is abruptly increased when the set time period $T_{OFFG}$ elapses. If the application standby condition is not satisfied at the time te, the C-1 oil pressure P is abruptly raised when the set time period $T_{OFF}$ elapses.

If the throttle opening θ is not fully closed at the time ta, that is, if the accelerator pedal is depressed, a relatively high torque is transmitted to the speed change unit 16 as the engagement of the first clutch C1 starts, so that the output torque of the vehicle increases. Thus, even if the vehicle is moving backward at the instant of applying the first clutch C1, the output torque acts to prevent the backward movement of the vehicle quickly. As a result, the decision of the clutch engagement completion is not erroneous because of the backward movement of the vehicle.

If, therefore, the throttle opening θ is not fully closed at the time ta, the C-1 oil pressure $P_{C1}$ is gradually raised at first, as in FIG. 9, and it is decided whether or not the preset first clutch engagement completion condition is satisfied. If the first clutch engagement completion condition is satisfied at the time td, the C-1 oil pressure $P_{C1}$ is abruptly raised.

In the third embodiment, the application end of the first clutch C1 is decided when the set time period $T_{NOT\ IDLE}$ elapses from the time td of the satisfaction of the clutch engagement completion condition.

The first clutch engagement completion condition is satisfied if the detected input RPM $N_{C1X}$ is smaller than the sum of the value $N_{OX} \cdot i$ and the set value N1, as follows:

$$N_{C1X} < N_{ox} \cdot i + N1.$$

Hence, the first clutch engagement completion condition is satisfied if the first clutch C1 is calculated to become substantially fully engaged immediately before the end of its application.

As a result, the first clutch C1 does not slip even if the input torque to the speed change unit 16 fluctuates with the depression of the accelerator pedal.

If the throttle opening θ is fully closed, on the other hand, the decision of the clutch engagement completion may be mistaken as the vehicle moves backward. As shown in FIG. 16, therefore, it is decided whether or not the application standby condition is satisfied, by the time the set time period $T_{OFF}$ elapses after the first clutch engagement completion condition has been satisfied. In this case, the application standby condition is whether or not the detected input RPM $N_{C1X}$ is smaller than the difference of the value $N_{OX} \cdot i$ minus the set value N1, as follows:

$$N_{C1X} < N_{ox} \cdot i - N1.$$

Hence, the application standby condition is satisfied if the first clutch C1 is calculated to be substantially less than fully engaged immediately after the satisfaction of the clutch engagement completion condition.

If the application standby condition is satisfied at the time te before the set time period $T_{OFF}$ elapses, it is found that the vehicle is moving backward. In this case, the following relationship is false until the first clutch C1 is actually applied:

$$N_{C1X} > N_{ox} \cdot i - N1.$$

It follows that the second clutch engagement completion condition is whether or not the detected input RPM $N_{C1X}$ is larger than the difference of the value $N_{OX}i$ minus the set value N1.

Hence, the second clutch engagement completion condition is satisfied if the first clutch C1 is calculated to become again into a substantially fully engaged state immediately before the end of the clutch engagement procedure but after the first clutch engagement completion condition has been satisfied.

The C-1 oil pressure $P_{C1}$ is abruptly increased when the set time period $T_{OFFG}$ elapses after the second clutch engagement completion condition has been satisfied. This makes it possible to prevent the C-1 oil pressure $P_{C1}$ from being abruptly increased in the course of clutch engagement and accordingly prevents the application shock from occurring in the first clutch C1.

On the other hand, the set time period $T_{OFF}$ (the first set time period) is set to correspond to a time period during which the first clutch C1 is calculated to be substantially less than fully engaged immediately before the end of the engagement procedure, and the set time period $T_{OFFG}$ (the second set time period) is set to correspond to the time period required for the first clutch C1 to become fully engaged after satisfaction of the second engagement completion condition immediately before the end of engagement procedure.

If the application standby condition is not satisfied until the set time period $T_{OFF}$ elapses, it is found that the vehicle is not moving backward. Hence, the C-1 oil pressure $P_{C1}$ is abruptly increased when the set time period $T_{OFF}$ elapses. This makes it possible to prevent the increase in the C-1 oil pressure $P_{C1}$ from being delayed more than necessary.

Thus, the first clutch C1 will never slip even if the input torque to the speed change unit 16 fluctuates, so that the decision of the engagement completion cannot be erroneous and application shock is prevented.

Program steps of the ECU in the third embodiment are shown in FIGS. 17 and 18.

Step S5-51: The input RPM $N_{C1}$ at the time tc for the satisfaction of the ending condition of the neutral control is saved as the initial RPM $N_{C1S}$.

Step S5-52: Flags FB, FC and FD are set to 0.

Step S5-53: The constant $P_{C1S}$ is added to the value $P_{C1N}$, and the resultant sum is used as the C-1 oil pressure $P_{C1}$.

Step S5-54: It is decided whether or not the input RPM $N_{C1}$ is smaller than the difference of the initial RPM $N_{C1S}$ minus a constant DSN. The routine advances to Step S5-55, if the input RPM $N_{C1}$ is smaller than the difference of the initial RPM $N_{C1S}$ minus the constant DSN, but returns to Step S5-53 if the input RPM $N_{C1}$ is equal to or more than the difference of the initial RPM $N_{C1S}$ minus the constant DSN.

Step S5-55: It is decided whether or not the throttle opening $\theta$ is in the fully closed state (IDL). The routine advances to Step S5-56, if the throttle opening $\theta$ is fully closed, but to Step S5-57 if not fully closed.

Step S5-56: The flag FA is set to an idle ON state (0).

Step S5-57: The flag FA is set to an idle OFF state (1).

Step S5-58: The gradual raising means 105 (FIG. 1) raises the C-1 oil pressure $P_{C1}$. Specifically, the sweep-up pressure $\Delta P_{C1}$ is added to the C-1 oil pressure $P_{C1}$, and the resultant sum is set as the C-1 oil pressure $P_{C1}$. By repeating this Step S5-58, the C-1 oil pressure $P_{C1}$ can be gradually raised.

Step S5-59: It is decided whether or not the flag FB is 0. The routine advances to Step S5-60, if the flag FB is 0, but to Step S5-63 if the flag FB is not 0.

Step S5-60: The clutch engagement completion condition satisfaction deciding means decides whether or not the first clutch engagement completion condition is satisfied, based on the detected output RPM $N_{OX}$, the detected input RPM $N_{C1X}$ and the gear ratio of the target gear stage. In this case, the clutch engagement completion condition is whether or not the detected input RPM $N_{C1X}$ is smaller than the sum of the value $N_{OX}i$ and the set value N1, as follows:

$$N_{C1X} < N_{OX}i + N1.$$

If the detected input RPM $N_{C1X}$ is smaller than the sum of the value $N_{OX}i$ and the set value N1, the first clutch engagement completion condition is satisfied at the time td. Hence, it is decided that the engagement of the first clutch C1 has been completed, and the routine advances to Step S5-61. If the detected input RPM $N_{C1X}$ is larger than the sum of the value $N_{OX}i$ and the set value N1, the routine returns to Step S5-55.

Step S5-61: The flag FB is set to 1.

Step S5-62: The time T1, as measured by the not-shown timer packaged in the automatic transmission control unit 41, is set to 0.

Step S5-63: It is decided whether or not the flag FA is in the idle ON state. The routine advances to Step S5-64, if the flag FA is in the idle ON state, and to Step S5-65 if the flag FA is not in the idle ON state.

Step S5-64: It is decided whether or not the time period T1 measured by the timer is longer than the set time period $T_{OFF}$. The routine advances to Step S5-66, if the time period T1 is longer than the set time period $T_{OFF}$ but to Step S5-67 if the time period Ti is shorter than the set time period $T_{OFF}$. In this case, the set time period $T_{OFF}$ is set to 0.1 seconds, for example.

Step S5-65: It is decided whether or not the time T1 by the timer is longer than the set time period $T_{NOT\ IDLE}$ when the flag FA is not in the idle ON state. The routine advances to Step S5-66, if the time T1 is longer than the set time period $T_{NOT\ IDLE}$ but returns to Step S5-55 if the time period T1 is shorter than the returns to Step S5-55 if the time period T1 is shorter than the set time period $T_{NOT\ IDLE}$. The set time $T_{NOT\ IDLE}$ is set as short as 0.05 seconds. If, therefore, the flag FA is not in the idle ON state at Step S5-63, the routine can also advance to the Step S5-66 via Step S5-65.

Step S5-66: It is decided whether or not the flag FC is 0. The routine advances to Step S5-75, if the flag FC is 0, and to Step S5-69 if the flag FC is not 0.

Step S5-68: The application standby condition satisfaction deciding means decides whether or not the application standby condition is satisfied based on the detected output RPM $N_{OX}$, the detected input RPM $N_{C1X}$, and the gear ratio i of the selected or target gear stage. In this case, the application standby condition is whether or not the detected input RPM $N_{C1X}$ is smaller than the difference of the value $N_{OX}i$ minus the set value N1, as follows:

$$N_{C1X} < N_{OX}i - N1.$$

If the detected input RPM $N_{C1X}$ is smaller than the difference of the value $N_{OX}i$ minus the set value N1, the application standby condition is satisfied at the time te. Hence, the routine advances to Step S5-69. If the detected input RPM $N_{C1X}$ is larger than the difference of the value $N_{OX}i$ minus the set value N1, the routine returns to Step S5-55.

Step S5-69: The flag FC is set to 1.

Step S5-70: It is decided whether or not the flag FD is 0. The routine advances to Step S5-71, if the flag FD is 0, and to Step S5-74 if the flag FD is not 0.

Step S5-71: The second clutch engagement completion condition satisfaction deciding means decides whether or not the second clutch engagement completion condition is satisfied, on the basis of the detected output RPM $N_{OX}$, the detected input RPM $N_{C1X}$, and the gear ratio i of the target gear stage. The second input RPM $N_{C1X}$ is larger than the difference of the value $N_{OX} \cdot i$ minus the set value N1, as follows:

$$N_{C1X} > N_{OX} \cdot i - N1.$$

The routine advances to Step S5-72, if the detected input RPM $N_{C1X}$ is larger than the difference of the value $N_{OX} \cdot i$ minus the set value N1, but returns to Step S5-55 if the detected input RPM $N_{C1X}$ is equal to or less than the difference of the value $N_{OX} \cdot i$ minus the set value N1. In connection with the second application standby condition, it is possible to decide that the vehicle is moving backward if the following relationship is satisfied at Step S5-60:

$$N_{C1X} < N_{OX} \cdot i + N1.$$

and if the following relationship is satisfied at Step-S5-68:

$$N_{C1X} < N_{OX} \cdot i - N1.$$

After this, it is possible to decide that the first clutch C1 completes its engagement, when the detected input RPM $N_{C1X}$ and the value $N_{OX} \cdot i$ become substantially equal to each other. Thus, the actual completion of the engagement of the first clutch C1 is decided if the following relationship is satisfied:

$$N_{C1X} > N_{OX} \cdot i - N1.$$

In this case, the set value N1 and the set time period $T_{OFFG}$ are set for the same reason as that of the set value N1 and the set time period $T_{NOT\ IDLE}$ as described in connection with Step S5-15.

Step S5-72: The flag FD is set to 1.

Step S5-73: The time measured by another timer is set to 0.

Step S5-74: It is decided whether or not the time T2 measured by another timer is longer than the set time period $T_{OFFG}$. The routine advances to Step S5-75, if the time period T2 is longer than the set time period $T_{OFFG}$ but returns to Step S5-55 if the time T2 is shorter than the set time period $T_{OFFG}$. In this case, the set time period $T_{OFFG}$ is set as short as 0.05 seconds.

Step S5-75: The abrupt raising means 107 turns OFF the third solenoid signal S3 for opening/closing the solenoid valve S3.

The present invention is not limited to the foregoing embodiments and many modifications, variations and changes in detail can be made without departing from the scope and spirit of the invention.

What is claimed is:

1. A control system for an automatic transmission having a speed change unit with a transmission mechanism, the control system comprising: a fluid transmission unit for transmitting rotation of an engine to said speed change unit; a clutch adapted to be applied when a forward running range is selected to transmit the rotation from said fluid transmission unit to the transmission mechanism of said speed change unit; a hydraulic servo for engaging and releasing said clutch; throttle opening detecting means for detecting a throttle opening; stopped state detecting means for detecting a vehicle stopped state defined by (a) a forward running range being selected, (b) said throttle opening detecting means detecting that the throttle opening being fully closed, (c) a brake pedal being depressed, and (d) vehicle speed being substantially zero; input speed detecting means for detecting input rotative speed of said speed change unit; output speed detecting means for detecting output rotative speed of said speed change unit; hydraulic control means for controlling the oil pressure to be fed to said hydraulic servo; and a control unit, wherein said control unit comprises: release means for releasing said clutch by decreasing the oil pressure fed to said hydraulic servo if said vehicle stopped state is detected by said stopped state detecting means; and application means for engaging said clutch by increasing the oil pressure fed to said hydraulic servo when said vehicle stopped state is absent as detected by said stopped state detecting means while said clutch is released;

wherein said application means includes: gradual raising means for gradually increasing the oil pressure fed to said hydraulic servo; application ending condition satisfaction deciding means for deciding satisfaction or non-satisfaction of a clutch engagement completion condition indicating completion of engagement of said clutch based on said input rotative speed, said output rotative speed and a gear ratio of a target gear stage; and abrupt raising means for abruptly increasing the oil pressure fed to said hydraulic servo in response to the satisfaction of said clutch engagement completion condition if said throttle opening detecting means detects that (a) the throttle opening is not fully closed or (b) the throttle opening is fully closed after elapse of a set time period from the instant of the satisfaction of said clutch engagement completion condition.

2. A control system for an automatic transmission according to claim 1 wherein said clutch engagement completion condition is defined by a predetermined relationship between said input rotative speed, said output rotative speed, said gear ratio and a set increment of rotative speed, said predetermined relationship representing the state of the clutch immediately before the end of its engagement completion.

3. A control system for an automatic transmission according to claim 1, wherein said set time period is set to a time period for the engagement completion of said clutch.

4. A control system for an automatic transmission having a speed change unit with a transmission mechanism, the control system comprising: a fluid transmission unit for transmitting rotation of an engine to said speed change unit; a clutch adapted to be applied when a forward running range is selected to transmit the rotation from said fluid transmission unit to the transmission mechanism of said speed change unit; a hydraulic servo for engaging and releasing said clutch; throttle opening detecting means for detecting a throttle opening; stopped state detecting means for detecting a vehicle stopped state defined by (a) a forward running range being selected, (b) said throttle opening detecting means detecting that the throttle opening is fully closed, (c) a brake pedal being depressed, and (d) vehicle speed being substantially zero; input speed detecting means for detecting input rotative speed of said speed change unit; output speed detecting means for detecting output rotative speed of said speed change unit; hydraulic control means for controlling the oil pressure fed to said hydraulic servo; and a control unit, wherein said control unit comprises: release means for releasing said clutch by decreasing the oil pressure fed to said hydraulic servo responsive to detection of a vehicle stopped state by said stopped state detecting means; and application means for engaging said clutch by increasing the oil pressure fed to said hydraulic servo responsive to detection of absence of said vehicle stopped state by said stopped state detecting means while said clutch is released;

wherein said application means includes: gradual raising means for gradually increasing the oil pressure fed to said hydraulic servo; application ending condition satisfaction deciding means for deciding satisfaction or non-satisfaction of a clutch engagement completion condition indicating completion of engagement of said clutch based on said input rotative speed, said output rotative speed and a gear ratio of a target gear stage; and abrupt pressure raising means for abruptly increasing the oil pressure fed to said hydraulic servo in response to the satisfaction of said clutch engagement completion condition if said throttle opening detecting means detects that the throttle opening is not fully closed.

5. A control system according to claim 2 wherein said predetermined relationship is defined by:

$$N_{C1x} < N_{ox} \cdot i + N_1.$$

wherein:

$N_{C1x}$ is the detected input rotative speed;

$N_{ox}$ is the detected output rotative speed;

i is the gear ratio of the speed change unit; and $N_1$ is the set increment of rotative speed.

* * * * *